(12) United States Patent
Byelashov et al.

(10) Patent No.: US 11,479,745 B2
(45) Date of Patent: Oct. 25, 2022

(54) HOP EXTRACTION PRODUCTS AND PROCESSES FOR IMPROVED BEVERAGE FERMENTATION AND FLAVOR

(71) Applicant: John I. Haas, Inc., Washington, DC (US)

(72) Inventors: Alex Byelashov, Yakima, WA (US); Mark Bossert, Yakima, WA (US); Virgil McDonald, Selah, WA (US); Michael Visgil, Ellensburg, WA (US); Victor Algazzali, Yakima, WA (US); Wendy Ann Lopez, Moxee, WA (US)

(73) Assignee: John I. Haas, Inc., Washington, DC (US)

( * ) Notice: Subject to any disclaimer, the term of this patent is extended or adjusted under 35 U.S.C. 154(b) by 254 days.

(21) Appl. No.: 15/945,604

(22) Filed: Apr. 4, 2018

(65) Prior Publication Data

US 2018/0291318 A1  Oct. 11, 2018

Related U.S. Application Data

(60) Provisional application No. 62/483,230, filed on Apr. 7, 2017.

(51) Int. Cl.
| | |
|---|---|
| *C12C 7/28* | (2006.01) |
| *C12C 3/10* | (2006.01) |
| *B01J 3/06* | (2006.01) |

(52) U.S. Cl.
CPC ............ *C12C 3/10* (2013.01); *B01J 3/06* (2013.01); *C12C 7/287* (2013.01)

(58) Field of Classification Search
CPC ................................. C12C 5/026; C12C 3/10
(Continued)

(56) References Cited

U.S. PATENT DOCUMENTS

| 4,844,939 A | 7/1989 | Todd, Jr. |
| 2016/0264916 A1* | 9/2016 | Mertens .................. C12C 3/08 |

FOREIGN PATENT DOCUMENTS

| CN | 101148632 A | * | 3/2008 |
| EP | 0 020 086 A1 | | 12/1980 |

(Continued)

OTHER PUBLICATIONS

Guth, "Quantitation and Sensory Studies of Character Impact Odorants of Different White Wine Varieties," *J. Agric. Food Chem.* 45:3027-3032, 1997.

(Continued)

*Primary Examiner* — Vera Stulii
(74) *Attorney, Agent, or Firm* — Seed IP Law Group LLP

(57) ABSTRACT

The present invention relates to new products and processes for making and using hop extract products comprising hop oils present in amounts between about 6 mL/100 g to about 40 mL/100 g, or more. The oil enriched hop extracts of the present invention also contain higher proportions of oil relative to other hop components typically found in hop extracts. Production of the oil enriched hop extracts may comprise a partial or a first extraction of hop materials. In one preferred embodiment, such extraction may occur under pressures of 1700 psi to about 3700 psi for less than three hours. The enriched oil extracts of the present invention can be used to produce beers having enhanced aroma and flavor profiles. The present invention also relates to products and processes for making and using second extractions of hop materials comprising alpha acids present in amounts of, for example, about 50% to about 70% (w/w).

12 Claims, 20 Drawing Sheets

(58) Field of Classification Search
USPC .......................................................... 426/600
See application file for complete search history.

(56) References Cited

FOREIGN PATENT DOCUMENTS

| | | |
|---|---|---|
| EP | 0 061 877 A2 | 10/1982 |
| EP | 0 611 168 A2 | 8/1994 |
| EP | 2 865 746 A1 | 4/2015 |
| GB | 1 557 123 A | 12/1979 |

OTHER PUBLICATIONS

Biendl et al., "Hops from Cultivation to Beer," *Fachverlaq Hans Carl GmbH Nürnbera*, 18 pages, 2012 (with Machine Translation).

\* cited by examiner

```
            Name _____
                 ├── Low ──┼── Medium ──┼── High ──┤
                 ├──┼──┼──┼──┼──┼──┼──┼──┼──┼──┤
                 0  1  2  3  4  5  6  7  8  9  10

Attributes           505   771   130   618   230
OHAI
Floral
Fruity
  Citrus
  Sweet Fruit
  Green Fruit
  Red Berries
Cream Caramel
Woody
Menthol
Herbal
Spicy
Green-Grassy
Vegetal
Catty
Bitterness Intensity
Bitterness Liking
Overall Liking
```

| Comments | |
|---|---|
| 505 | |
| 771 | |
| 130 | |
| 618 | |
| 230 | |

HPLC chromatogram of final Columbus CO2 Hop Extract, showing alpha and beta peaks. Final alpha acids concentration of 53.5% and 17.4% beta acids by HPLC.

Total oil analyzed by GC to qualify the oils collected at each interval.

HPLC results of alpha acids (Cohumulone and Humulone) and beta acids (Colupulone and Lupulone) concentrations during each collection time.

Composite Sampling of Supercritical CO2 Extraction of Columbus at 3700 PSI.

HOP EXTRACTION PRODUCTS AND PROCESSES FOR IMPROVED BEVERAGE FERMENTATION AND FLAVOR

BACKGROUND

Technical Field

The present invention relates to new $CO_2$ oil enriched hop extract products and processes for making and using $CO_2$ oil enriched hop extract products in brewing to produce beer with significantly enhanced aroma and flavor profiles and to do so with greater efficiency than is made possible by conventionally available $CO_2$ hop extract products. Oil enriched hop extract products of the present invention comprise between about 6% to about 40% oil, about 15% to about 80% alpha acids, about 0% to about 4% uncharacterized materials. Processes for making oil enriched hop extract products comprise one or more $CO_2$ extractions of hop materials at extraction pressures between about 500 pounds per square inch (psi) to about 5,000 psi or about 1070 psi to about 5,000 psi, first extraction times between about one to about eight hours, and first extraction temperatures between about 31° C. to about 80° C. Oil enriched hop extract products of the present invention are used to replace or supplement hop additions to beer wort during late hot side boil kettle addition and brewery whirlpool applications.

Description of the Related Art

The brewing process comprises boiling of sweet wort achieved from steeping cereal grains in water and then fermenting the sweet wort with yeast. The finished product after fermentation of the boiled sweet wort with yeast is considered beer. Brewers generally use hops in beer in order to promote bitterness balance and/or impart characteristic flavors including but not limited to fruity, floral, citrus, herbal, and woody. Hopping during the brewing process can be broken down into two main categories: traditional hopping and dry hopping.

Traditional hopping refers to the addition of hops to boiling sweet wort in the brewers' kettle, sometimes termed a "hot side" addition. Hops can be added at any point during the boiling process.

Iso-alpha acids, derived from hops, are the primary contributor to bitterness in beer. Boiling time for hops is important in obtaining maximum bittering efficiency, which involves isomerization of alpha acids in hops to iso-alpha acids under heat. Thus, hops for bittering that are added early during the "hot side" brew kettle boil most effectively contribute to alpha acid isomerization to iso-alpha acids and solubility of iso-alpha acids in the wort in order to optimize hops' bittering potential or utilization.

Hop oils or hop essential oils, also derived from hops, are the primary contributor to hop aroma and flavor in beers. Hop oils may provide distinctive aromas (e.g., citrus, floral, fruity, herbal, woody) depending on the hop variety used. Hop oils are volatile and easily lost in the brew kettle boil, at least in part, due to heat. If the brewer desires to increase the aromatic and flavorful hop profile in a finished beer, adding hops later in the boil process offers increased potential of preserving desired flavor and aroma outcomes from hop oils. Thus, best preservation of hop oil aroma and flavoring components of hops is achieved by adding hops to a cooling and settling step that immediately succeeds the completion of the boil process, a step also known as the whirlpool. It is noted that during the whirlpool step, the wort is still hot, so some alpha acids isomerization is still occurring; however hop oil loss due to volatility is minimized.

Thus, while early introduction of hops during the "hot side" boil encourages maximum bittering due to isomerization of alpha acids from hops into iso-alpha acids, such early introduction is deleterious to volatile hop oils such that the aroma and flavoring characteristics are diminished or lost and not found in the finished beer. That is, whole hop additions at different points during the brewing process inevitably fail to maximize the respective potential contributions of hop alpha acids for bittering or hop oils for aroma and flavoring because unlocking these contributions from hops requires different brewing conditions such as, for example, temperature and timing.

Dry hopping is a hopping technique that was originally utilized as a bacteriostatic application for preservation of finished beer. Generally, whole hops, plugs, and pellet products have been added to beer that has finished or nearly finished fermentation, sometimes termed "cold-side" addition. This practice has more recently gained importance due to the success of the U.S. craft beer market, which are continually producing higher percentages of dry-hopped beers for enhanced aroma and flavor. Dry hopping is used when the hop serves as the main flavor ingredient to achieve an intense and distinct aroma profile. For example, a brewer may showcase a specific hop variety's flavor profile or produce a certain beer style, such as India Pale Ale (IPA). To achieve such results, hop varieties may be added at various stages, using various quantities, addition times, and temperatures. Each of these factors will greatly impact the finished flavor profile of the beer produced.

Traditionally, a brewer chooses a specific variety of hops with the desire of achieving a specific flavor and aroma outcome in a beer, in the same way vintners choose specific varieties of grapes to deliver a specific flavor and aroma outcome in their wines. Hop flavor and aroma delivery is primarily due to the oils which are present in each variety of hop (including hop oil composition and concentration), and the amount of these oils delivered into the beer. Efficiency of flavor and aroma delivery will be variable from brewery to brewery based on the equipment used.

It is known that $CO_2$ hop extracts, rather than whole hops, plugs, and pellet products, may be used to increase hop aroma transfer into beer. Some conventional $CO_2$ hop extract products, simply described as "$CO_2$ Hop Extract" or "Hop Extract," are available for commercial purchase from companies including, but not limited to, the Barth-Haas Group, Yakima Chief-Hop Union, and Hopsteiner Companies.

Extraction of plant materials using $CO_2$ as a solvent is generally known. The $CO_2$ extraction process involves a method in which carbon as either a gas or a liquid is passed through hop pellets at high pressure and temperature as a means of separating beneficial hop compounds from preferentially less impactful ones. Conventional $CO_2$ extraction typically results in a liquid extract that can be directly applied to the brewing boil kettle. Conventional $CO_2$ extraction predominantly yields alpha acids, beta acids, and essential oils of hops. This resulting extract product is generally stable and provides alpha acids, beta acids, and essential oils of hops in a concentrated form that is about four to five times more concentrated relative to traditional hop pellets prepared using the same hop variety.

Conventional $CO_2$ hop extraction is typically done at a single pressure throughout the extraction process. The $CO_2$ used is either in a liquid, sub-critical, or supercritical state. $CO_2$ that is used in a liquid or subcritical state promotes an environment that facilitates preferential extraction of hop oils relative to other hop components due to its lower optimal temperature range of 7-8° C. and pressure range of 10-12 bar (145-174 psi) being used to maintain correct $CO_2$ temperature and flow rate. Supercritical $CO_2$ extraction offers greater versatility and generally operates between a lower temperature of 40° C. and up to as high as about 80° C. at pressures as high as 350 bar (5076 psi). Thus, supercritical $CO_2$ extraction provides a wider range of hop component compositions that, on one end with lower pressure, may be similar to liquid or subcritical $CO_2$ extraction that best favors hop oils extraction to, at the other end with higher pressure, include uncharacterized materials, such as hard resins and tannins.

Generally, $CO_2$ extraction processes produce extracts which generally compositionally correspond to or reflect the starting green plant or pellet feedstock used. Thus, one can expect that a hop variety, or even a single extraction batch, which has a high oil, alpha acids, or uncharacterized materials content in the starting material, will also have about that same composition ratio in the extract.

For example, a hop variety such Ekuanot™, which has an oil content of about 2.5 mL/100 g to about 4.5 mL/100 g and alpha acids content between about 14.5% to about 15.5% in the plant, will generally produce extracts having oil concentrations from about 12.2 mL/100 g to about 13 mL/100 g and an alpha acids content between about 49% to about 50%. Alternatively, from another hop variety, MOSAIC®, which has an oil content of about 1 mL/100 g to about 1.5 mL/100 g and an alpha acids content of about 11.5% to about 13.5% in the plant, one can expect to obtain an extract having an oil content in about the range of about 3% to about 5% and an alpha acids content in the range of about 47% to about 49%. These examples are provided solely for the purpose of illustrating the conceptual information of the $CO_2$ extraction process. The expected percentage of uncharacterized materials follows the same conceptual framework in that a plant having a high concentration of uncharacterized materials will also produce extracts having a proportionally higher concentration of uncharacterized materials. This is due to the fact that conventional $CO_2$ extraction process extracts virtually all of the oils, alpha acids, and uncharacterized materials contained in the plant material, i.e., plants which are naturally high in oils, alpha acids, or uncharacterized materials will have extracts which have a correspondingly high level of those compounds.

To generate supercritical $CO_2$ hop extracts, liquid $CO_2$ may be compressed to about 250 Bar or 3700 psi; however, a much wider range, perhaps 1070 psi at or above 31° C. to 5,000 psi may be used and, optionally, with a pump and the temperature adjusted. The supercritical $CO_2$ passes through an extraction vessel filled with hop pellets. The supercritical $CO_2$ with the dissolved hop material passes through a pressure control valve, reducing the pressure, evaporating the $CO_2$ supercritical fluid into a gas in a separator vessel. It is here that the hop material can be pulled from the tank and the gaseous $CO_2$ can be condensed back into a liquid for storage for subsequent extractions.

Subcritical liquid or gas extractions may be produced using compression between about 500 psi to 1070 psi.

Conventional $CO_2$ hop extracts, due to their better utilization potential of bittering (alpha acid isomerization) as compared to whole hop cones or hop pellets, are typically added at the beginning of the wort boiling process (at the beginning of what is typically a 60-90 minute boil).

Conventional CO2 extract is rich in a variety of uncharacterized materials, such as resins, hard resins, waxes, and tannins. It is noted that the presence of uncharacterized materials, including potentially wax materials, could contribute to a variety of problematic brewing issues. These problematic brewing issues include, but are not limiting to, lower extract solubility into wort, plugging or gumming of equipment such as pumps, pipes and hoses, and increased cleaning efforts due to extract sticking to kettles and other processing equipment especially when used late in the brewing process.

Conventional $CO_2$ extracts provide some additional benefits over using whole cone hops and pellets. For example, conventional $CO_2$ extracts have an enhanced brewing bittering utilization, homogeneity, and are more concentrated than hop pellets and whole hop cones. Conventional $CO_2$ extracts are not as easy to use and typically require either punching holes in the $CO_2$ extract tins and immersing them in the brew kettle, or are so viscous that pre-heating a $CO_2$ extract tin is required before the $CO_2$ extract may be poured directly into the wort. These procedures are an inconvenience. Further, such pre-heating may damage the labile hop oil components of the $CO_2$ extract.

Previous attempts to make $CO_2$ oil enriched extracts have been made for applications outside the brewing industry and are generally poorly described. For example, some $CO_2$ oil enriched extracts have been made in a single step extraction process involving extraction temperatures in the range of 50-60° C. and pressures of 150-350 bar or about 2175-5076 psi (supercritical extraction) or temperatures in the range of 5-15° C. and pressures of 10-70 bar or about 145-1015 psi (liquid or subcritical extraction). Still other $CO_2$ oil enriched extracts have been made wherein the alpha acid content or other extract components that may impact aroma and flavor in a brewing context are substantially removed for applications outside the brewing industry. For example, such extracts have been used as starting materials to make other refined or modified hop extracts and for the further extraction or processing of hop oils, and also as an ingredient in non-alcoholic beers.

While $CO_2$ hop extracts are currently available, the present inventors have found that conventional $CO_2$ hop extract products and processes are more limited in their late brewing application for enhanced beer aroma and flavor. Here, for the first time, the present inventors disclose novel $CO_2$ oil enriched extracts suitable for, and improved for, use in the brewing industry that are produced using efficient processes and implemented using novel methods. The current inventive $CO_2$ oil enriched extracts are prepared and deployed according to the newly described processes described herein. The $CO_2$ oil enriched extracts and processes of the present invention address and solve needs in the brewing industry for improved $CO_2$ oil enriched hop extract products, the efficient production of $CO_2$ oil enriched hop extracts to deliver increased flavor and aroma to beer, and use of these extracts during the brewing process to maximize the beneficial aroma and flavor properties of hop oils in brewed products. The present inventors found that increasing the concentration of oils in a hop addition while using an extraction process to make the oil enriched hop extract within certain operational parameters or ensuring a particular oil enriched hop extract composition profile, and introducing the oil enriched hop extract in a manner which best protects against hop oil volatility is an effective and efficient way to provide maximum flavor and aroma delivery from hop materials to beers.

Compared to conventional $CO_2$ hop extracts, the oil enriched extracts of the present invention also provide 1) improved pourability due to lower viscosity, 2) greater solubility due to, in part, lower uncharacterized materials concentrations, and 3) positive taste and aroma impacts due to higher oil content when used in the whirlpool relative to conventional $CO_2$ hop extracts. Additionally, the oil enriched extracts of the present invention advantageously do not contain vegetative material that could otherwise absorb liquid in the brew kettle; thus, resulting in potential yield loss to the brewer. For example, it has been determined that for every 1 kg of hop pellets that are added to a brew kettle, 10 L of liquid are subsequently absorbed. Since the oil enriched extracts of the present invention have negligible liquid absorptive material in their compositions, they beneficially avoid such yield losses.

BRIEF SUMMARY

The present invention relates to new $CO_2$ oil enriched hop extract products and processes for making and using $CO_2$ oil enriched hop extract products in brewing to produce beer with significantly enhanced aroma and flavor profiles and to do so with greater efficiency than is made possible by conventionally available $CO_2$ hop extract products. The present invention relates to extraction of hop materials to prepare, for example, a first extraction or cut of the material and a second extraction or cut of the material. First extractions or seconds are partial extractions of the hop materials being extracted.

Oil enriched hop extract products of the present invention comprise between about 6% to about 40% oil, about 15% to about 80% alpha acids, about 0% to about 4% uncharacterized materials. Processes for making oil enriched hop extract products comprise one or more $CO_2$ extractions of hop materials at extraction pressures between about 500 pounds per square inch (psi) to about 5,000 psi, or at extraction pressures between about 1070 psi to about 5,000 psi for supercritical extraction, first extraction times between about one to about eight hours, and first extraction temperatures between about 31° C. to about 80° C. Oil enriched hop extract products of the present invention are used to replace or supplement hop additions to beer wort during brewing.

One embodiment of this invention is an oil enriched hop extract comprising between about 6% to about 40% oil, or about 10% to about 25% oil, or about or about 17% to about 20% oil, or about 12% to about 40% oil, or about 15% to about 40% oil. Another embodiment of this invention is an oil enriched hop extract comprising, about 15% to about 80% alpha acids, or about 15% to about 65% alpha acids, or about 20% to about 60% alpha acids, or about 25% to about 55% alpha acids. Another embodiment of this invention is an oil enriched hop extract comprising, about 0% to about 4% uncharacterized materials, or about 0% to about 3% uncharacterized materials, or about 1% to about 3% uncharacterized materials, or about 1% to about 2% uncharacterized materials. All percentages provided herein relate to the % of the final product composition by weight.

Other embodiments of the oil enriched hop extracts of the present invention comprise one or more of about 6% to about 40% oil, or about 10% to about 25% oil, or about 17% to about 20% oil, about 15% to about 80% alpha acids, or about 15% to about 65% alpha acids, or about 20% to about 60% alpha acids, or about 25% to about 55% alpha acids, and about 0% to about 4% uncharacterized materials, or about 0% to about 3% uncharacterized materials, or about 1% to about 3% uncharacterized materials, or about 1% to about 2% uncharacterized materials.

Another embodiment of the present invention relates to a process for making an oil enriched hop extract. The present invention includes processes for making oil enriched hop extracts comprising one or more of about 6% to about 40% oil, or about 10% to about 25% oil, or about 17% to about 20% oil, about 15% to about 80% alpha acids, or about 15% to about 65% alpha acids, or about 20% to about 60% alpha acids, or about 25% to about 55% alpha acids, and about 0% to about 4% uncharacterized materials, or about 0% to about 3% uncharacterized materials, or about 1% to about 3% uncharacterized materials, or about 1% to about 2% uncharacterized materials.

In one embodiment of the present invention, processes include preparation of oil enriched hop extracts using a single extraction or multiple extractions of a hops material, wherein each extraction may include variation in any of temperature, pressure, and duration or may include stable temperature or pressure. In another embodiment, processes include addition of one or more separate components to an oil enriched hop extract made using a single extraction or multiple extractions of a hops material. That is, hop oil or alpha acids may be added to a hop extract product in order to achieve the oil enriched hop extracts of the present invention. Such separately added components may be provided in a pure or substantially pure and concentrated form. The process may further include additional separation or purification steps such as, for example, molecular distillation or any sort of fractional separation or purification process. For example, a process may include a further addition of hop oil or alpha acids prepared by an extraction or further separation and purification step that is then added back to a single extract oil enriched hop extract in order to achieve a particular product profile (e.g., a particular oil % or alpha acid %). FIGS. 1, 2, and 3 provides diagrams showing exemplary processes of the present invention.

Still another embodiment of the present invention, processes include preparation of oil enriched hop extracts using an extraction performed at, for example, pressures between about 500 pounds per square inch (psi) to about 5,000 psi, or between about 1,200 psi to about 4,000 psi, or between about 1,600 psi to about 3,700 psi, or about 2,200 psi, for time durations between about one to about eight hours, or about two to about six hours, or about two to about four hours, or about four to about five hours, or about two hours, and temperatures between about 31° C. to about 80° C. and at pressures as high as 350 bar (about 5,076 psi), or about 40° C. to about 60° C., or about 48° C. It is noted that pressure below 1070 psi is subcritical.

Another embodiment of the present invention relates to a process for using an oil enriched hop extract during the brewing process. Such processes comprise introduction of one or more oil enriched hop extracts at any point during the boiling process and during the whirlpool, i.e., the cooling and settling step that follows the completion of the boil process. In a preferred embodiment, the process includes introduction of an oil enriched hop extract during the whirlpool. In another embodiment, the process the process includes introduction of an oil enriched hop extract during the last 60 minutes of the boil, or during the last 45 minutes of the boil, or during the last 30 minutes of the boil, or during the last 20 minutes of the boil, or during the last 15 minutes of the boil, or during the last 10 minutes of the boil, or during the last 5 minutes of the boil, or at the end of the boil and just prior to, or upon the start of, the whirlpool. In still another embodiment, the oil enriched hop extract is introduced to an otherwise finished beer, or near finished beer.

Oil enriched hop extracts are referred to throughout this document. It is noted that this term generally comprises first fraction extracts and first fraction extracts to which addi- FIG. 20 provides a bar graph of individual compounds of 3700 psi for Columbus hop extract samples taken every 30 minutes

DETAILED DESCRIPTION

Figure 1:
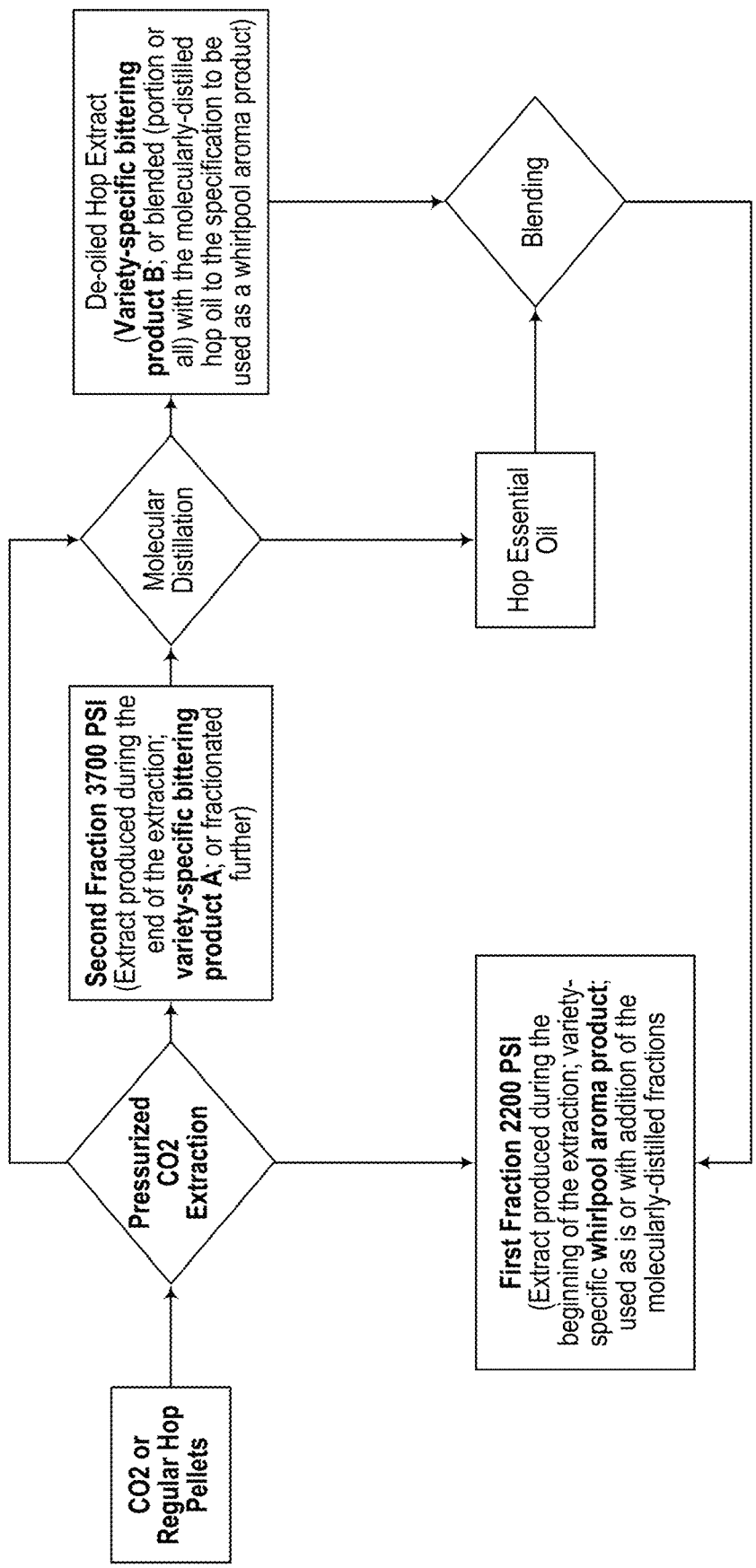
FIG. 1 depicts one embodiment of the present inventive process for making extract products.

The present invention relates to new products and processes for making and using $CO_2$ extracted select hop compounds, including oil enriched hop extract products. The present inventors have developed new products and processes for making and using $CO_2$ extracted select hop compounds that provide beer producers with an extract solutions that impart a significant varietal aroma and flavor profile to the finished beer, reduce or eliminate the use of pellets in the late boil, whirlpool, or dry hopping stages, increase brewers flavor and aroma utilization and impact, and decrease the brewers' yield losses.

While $CO_2$ extraction technology is described in detail below, the present invention may also involve the many other known extraction technologies such as ethanol, hexane, or other organic extractions methods.

1. Extraction Products Produced by Process $CO_2$ oil enriched hop extract products according to the present invention may comprise between about 6-40 mL/100 g, between about 20-40 mL/100 g, between about 25-40 mL/100 g, between about 25-35 mL/100 g, between about 30-40 mL/100 g, between about 30-35 mL/100 g, between about 35-40 mL/100 g, or greater than 40 mL/100 g of oil in the finished extracted product $CO_2$ oil enriched products according to the present invention. Here, it is assumed that 1 mL of hop oil is about 1 gram; accordingly, the above hop oil amounts may be understood to also refer to % w/w. For example, a $CO_2$ oil enriched hop extract products according to the present invention comprising between about 12-40 mL/100 g may be understood to comprise about 12% to about 40% (w/w) hop oil; meanwhile, a $CO_2$ oil enriched hop extract product according to the present invention comprising between about 15-40 mL/100 g may be understood to comprise about 15% to about 40% (w/w) hop oil.

$CO_2$ oil enriched hop extract products according to the present invention may further comprise alpha acids that range from about 15% to about 80% alpha acids, or about 15% to about 65% alpha acids, or about 20% to about 60% alpha acids, or about 25% to about 55% alpha acids or between about 15-20%, about 20-25%, about 25-30%, about 30-35%, about 35-40%, about 40-45%, about 45-50%, about 50-55%, about 55-60%, and about 60-65% alpha acids. All percentages indicate % (w/w).

$CO_2$ oil enriched hop extract products according to the present invention may include uncharacterized materials in reduced amounts relative to conventional $CO_2$ extracts, which may contain about 3.0-7.0% (w/w) uncharacterized materials. For example, $CO_2$ oil enriched hop extract products according to the present invention may include uncharacterized materials at a concentration of about 0%, or none or no uncharacterized materials, to about 4% uncharacterized materials, or about 0.5% to about 3% uncharacterized materials, or about 1% to about 3% uncharacterized materials, or about 1% to about 2% uncharacterized materials, or about 0.0-4.0%, about 0.05-3.0%, about 0.1-3.0%, about 0.15-3.0%, about 0.15-2.5%, about 0.2-2.5%, about 0.2%. All percentages indicate % (w/w).

The above oil, alpha acid, and uncharacterized materials composition ranges in the $CO_2$ oil enriched hop extract products may vary depending hop variety. It is also noted that while specific amounts and ranges are specified herein, it is contemplated that the present invention includes any amount or range that falls within the broadest range provided for each of hop oils, alpha acids, and uncharacterized materials.

Products of the present invention have a higher than expected oil content while also having a lower composition of hop alpha acids and a lower composition of hop uncharacterized materials than do extracts produced by conventional $CO_2$ extraction conditions. The high hop oil content allows for the more efficient transfer of hop aroma than standard $CO_2$ extracts. The low alpha acid content allows for this maximum transference of aroma without over bittering the beer. Thus, one significant advantage to inventors' $CO_2$ enriched oil extracts is the significantly increased aroma/favoring contribution to the beer without increasing the bitterness of the beer beyond what would be considered palatable. The low hop uncharacterized materials content allows the product to be used without the water insoluble uncharacterized materials precipitating on brewing equipment or resulting to beer haze.

In one preferred embodiment, the inventive products have about double the oil content relative to standard extracts and a relatively lower alpha acid content for the amount of oil delivered. For example, a slightly lower alpha acid content of about 10% (w/w) to about 20% (w/w) for the amount of oil delivered. Thus, a greater amount of hop aroma can be transferred to the beer without over bittering a beer (as measured, for example, by HPLC or spectrophotometry). It is also noted that a brewer using standard extracts instead of the inventors' $CO_2$ enriched oil extracts, would need to add two to three times more of the standard extract than the present inventive product to achieve introduction of comparable amounts of oil. Delivering a desirable oil load and still achieving desired alpha acid load, while also taking into account alpha acid utilizations of bittering late in the kettle will vary from brewery to brewery.

It is again noted that alpha acids are the pre-cursor to iso-alpha acids, which are the compounds responsible for the bitterness of beer. Accordingly, because a brewer would be adding far less of the inventors' $CO_2$ enriched oil extracts than they would a standard extract having a relatively greater proportion of alpha acids, there would be less or no danger of over bittering. Internal brewing and sensory results indicate that when using the inventive oil-rich $CO_2$ extract product as compared to standard $CO_2$ extract in a beer, increases in perceptions of fruity and flavors along with Overall Hop Aroma Intensity (OHAI) are exhibited almost twice as much with described invented extract than with standard extract.

In a preferred embodiment, the inventors' $CO_2$ enriched oil extracts contain less alpha acids than standard extract. It is generally noted that, in a preferred embodiment, the inventors' $CO_2$ enriched oil extract typically contains less overall alpha acids than that of standard $CO_2$ extract, however this will be varietal and extraction parameter dependent. Also, because of the lower uncharacterized materials content in the inventors' $CO_2$ enriched oil extracts, beer production is eased as addition of these extracts helps reduce problematic uncharacterized materials build up on brewery equipment or in other processing equipment that comes in contact with the material.

Advantageously, the inventors have found that the present invention may produce a $CO_2$ extract having a substantially lower viscosity than conventional $CO_2$ extracts, i.e., in most cases less than about 1-3 Pas at 30-40° C. It is noted that this viscosity range may be contingent on the varietal of hop being extracted.

In one example, reflected in Tables 1 and 2 below, different viscosity levels of enriched hop oil extracts as compared to standard $CO_2$ extracts of the same varieties are provided as a side-by-side comparison. To best reflect the data in this table, a lower centipoise (cPs) value reflects a less viscous, more flowable product. Therefore, in both iterations, the enriched hop oil extracts outperformed standard $CO_2$ extract, exhibiting 1.4-2.2 times more flowability/less viscosity.

TABLE 1

ENRICHED HOP OIL EXTRACT VISCOSITIES

| Variety | Temperature (° C.) | Viscosity (cPs) |
|---|---|---|
| CITRA | 20.1 | 1950 |
| EKUANOT | 21.1 | 1940 |

TABLE 2

STANDARD $CO_2$ EXTRACT VISCOSITIES

| Variety | Temperature (° C.) | Viscosity (cPs) |
|---|---|---|
| CITRA | 21.6 | 4300 |
| EKUANOT | 21.4 | 2800 |

The lower viscosity of the oil enriched hop extract products significantly improves the ease of use to the brewer in that these extracts can be considered to be pourable at room temperature. This avoids the need for separate heating of the oil enriched hop extract products prior to use. By avoiding the need for pre-heating, the oil enriched hop extract products may also avoid unnecessary damage to the heat labile hop oils. In some instances, however, such as when the extract is stored under refrigeration conditions, a light warming of oil enriched hop extract, to room temperature (20-25° C.) will help facilitate more ease of use, and therefore much easier to dose in the brewing process. Often, brewers must first pre-heat viscous $CO_2$ extracts (e.g., above 1-3 Pas at 30-40° C.) to about 40° C. before they are added to the brewing process, but the visibly lower viscosity of this invention reduces or eliminates this additional heating requirement for extract additions to the brewing process.

In one embodiment, the first product extract produced using low pressure and the second product extract produced using high pressure may be considered as separate products or partial extractions or may be considered, in their combination, as a single product comprising two components.

For example, a first product extract, or partial extraction, may result from the low pressure extraction and a second product extract, or partial extraction, may result from the high pressure extraction. Provided below is Table 3 which shows component parts of inventors' $CO_2$ enriched oil extracts produced in accordance with the present invention. The extracts described in Table 3 were prepared using a first extraction at 2200 psi for two hours and a second extraction at 3700 psi for the remainder of the extraction, or about two to three hours.

Table 3 shows relative contents of oil, alpha acids, and waxes in seven hop varieties in plant, standard extract, and inventive first extract and second extract forms, or partial extracts. Analysis of oil content was performed by steam distillation. Analysis of alpha acids content was determined by HPLC. The following abbreviations are used in: Table 3: Plant—Pt; Alpha % by weight—α; Extract—X; Standard—Sd; Waxes % by weight—Wx; Oils mL/100 g—O; first—1°; second 2°.

TABLE 3

| Hop variety | Pt O | Pt α | Sd X O | Sd X α | Sd X Wx | 1° X O | 1° X α | 1° X Wx | 2° X O | 2° X α | 2° X Wx |
|---|---|---|---|---|---|---|---|---|---|---|---|
| EKUANOT™ | 3.5 | 15 | 10-20 | 40-60 | 3-7 | 10-40 | 30-55 | 0-4 | 1-10 | 50-70 | 2-8 |
| Cascade | 1 | 6 | 8-12 | 30-50 | 3-7 | 8-40 | 15-50 | 0-4 | 1-10 | 50-70 | 2-8 |
| Nugget | 1 | 13 | 8-12 | 40-60 | 3-7 | 8-40 | 30-55 | 0-4 | 1-10 | 50-70 | 2-8 |
| Zeus | 3 | 16 | 6-18 | 45-65 | 3-7 | 10-40 | 30-55 | 0-4 | 1-10 | 50-70 | 2-8 |
| Columbus | 3 | 16 | 6-18 | 45-65 | 3-7 | 10-40 | 30-55 | 0-4 | 1-10 | 50-70 | 2-8 |
| CITRA | 2.5 | 12 | 6-18 | 40-60 | 3-7 | 10-40 | 30-55 | 0-4 | 1-10 | 50-70 | 2-8 |
| Centennial | 2.0 | 10.5 | 6-18 | 40-60 | 3-7 | 10-40 | 30-55 | 0-4 | 1-10 | 50-70 | 2-8 |

Oil enriched hop extracts according to the present invention may refer to taking the beginning, more oil-rich fraction, termed "first fraction" (or first extract or first cut) of $CO_2$ extracted material at the beginning of the process run conducted at pressures ranging from 1200 psi to 5000 psi, and may include pressures of, for example, 1600 psi, 2200 psi, and 3700 psi. After the oil-rich "first fraction has been obtained, the extraction may continue until completion to obtain the less oil-rich fraction, termed "second fraction" (or second extract or second cut). Non-supercritical extractions may also be processed at pressures ranging from about 500 psi to about 1070 psi.

The first fraction oil enriched hop extract can be conceived or produced at one single pressure within the range described above or in combination with other pressures as described above. Further, the oil enriched hop extract can be conceived or produced through blending portions or components of the second fraction back into the first fraction or by including separately prepared hop extract components, and this can be done with or without adding more oil to the invention. Obtaining the oil enriched hop extract by blending portions or components of the second fraction back into the first fraction may be useful in obtaining better yield efficiencies of oil enriched hop extract. Addition of hop extract components to the first fraction may be used to help establish analytical consistency within the invention, consistency of the product within certain parameters, and may be explored into continued brewing process applications.

The second fraction material may be used as a means of standardizing the first fraction material in the oil enriched hop extract. For example, and as shown in FIG. 1, the second fraction or second cut material may be used to extract more oils via molecular distillation or other separation or purification process and then added back to the first fraction material in the oil enriched hop extract to produce more oil enriched hop extract product. Alternatively, such second fraction material may be used as a feedstock toward producing other hop extract products, or used by itself in the brewing process. For example, the second fraction material may be used as a bittering agent. Therefore, the second fraction material has valuable components that may help fortify the current oil enriched hop extract and may also help facilitate the production of other hop products.

The second fraction may have higher levels of alpha acids than the first fraction. Table 4 below shows relative mean alpha acid composition by % (w/w) in the first fraction and the second fraction for fractions prepared at about 48° C. and using a first extraction at 2200 psi for two hours and a second extraction at 3700 psi for the remainder of the extraction, generally about two to three hours.

TABLE 4

| Hop Variety | First fraction alpha acid % mean | Second fraction alpha acid % mean |
|---|---|---|
| MOSAIC (n = 4) | 51.39% | 57.20% |
| CITRA (n = 4) | 49.95% | 58.91% |
| EKUANOT (n = 2) | 43.80% | 58.80% |

Embodiments of this invention may include a first fraction of extract which may comprise oils in the range of about 10% to about 40%, or about 15% to about 40%, or about 20% to about 40%, or about 25% to about 40%, or about 30% to about 40%, or about 35% to about 40%, about 10% to about 35%, or about 15% to about 35%, or about 20% to about 35%, or about 25% to about 35%, or about 30% to about 35%, or about 35%, or about greater than 40%; and an alpha content in the range of about 30% to about 50%, or about 35% to about 50%, or about 40% to about 50%, or about 45% to about 50%, or about 30% to about 45%, or about 35% to about 45%, or about 40% to about 45%, or about or greater than 45%, or about or greater than 50%.

First fractions of the present invention may have relative concentration ratios of hop oils to alpha acids of about 33:67 oils to alpha acids. Other exemplary ratios of hop oils to alpha acids for first extracts of the present invention may include about 40:60 oils to alpha acids or about 45:55 oils to alpha acids; about 50:50 oils to alpha acids; about 55:45 oils to alpha acids; about 60:40 oils to alpha acids; about 65:35 oils to alpha acids; or about 70:30 oils to alpha acids.

Embodiments of this invention may include a second fraction of extract which may comprise oils in the range of about 1% to about 10%, or about 2% to about 8%, or about 4% to about 6%, or about 5%; and an alpha content in the range of 50% to 70%, or about 55% to about 65%, or about 60%.

In another embodiment, the product extracts of the present invention may be modified by the addition of certain chemicals or compounds which make this hop extract more dispersible or soluble in beer or wort. The following modifications to this hop extract are examples of additions to the extract which are preferentially consisted, but not limited to: long or short chain alcohols such as methanol or ethanol, alkali metals such as KOH or NaOH, propylene glycol or other glycol compounds, organic acids such as acidic or lactic acids, sugars such as sucrose or glucose, or other commonly known co-solvents or surfactants.

Analysis of hop oils and their contributions to aroma and flavor across hop varieties is made possible by use of laboratory machinery such as gas chromatography. Well over 400 aroma and flavor compounds have been identified. And the contributions of some of these compounds are realized in beer at very low thresholds which will subsequently create distinct odors both in a singular and additive fashion. Hop flavor and aroma in beer can be used as a basis to distinguish between hop varieties.

Varietal hop flavors span a spectrum of fruits, herbs, vegetables, woods, and spices. Many hop varieties possess unique flavors that can only be delivered by that cultivar, or variety. Hop variety type is considered to be the biggest factor affecting the flavor outcome of a crop.

The inventors have determined that the products of the present invention can provide superior transference of hop flavor and aroma to finished beer for any given hop variety type. The superior results achieved by the oil enriched hop extracts according to the present invention are reflected in sensory data associated with beer crafted using inventors' enriched oil extracts versus beer crafted with conventional standard extracts, and this is the case regardless of whether these standard extracts were prepared by supercritical $CO_2$ extracts.

Sensory data for these products was collected by a John I. Haas trained descriptive analysis panel, consisting of 26 employees, 16 males and 10 females, ranging from ages 27 to 66. Here, the American Society of Brewing Chemists (ASBC) Sensory-10 Descriptive Analysis Sensory was employed as described herein and further exemplified below and in the Figures.

Specifically, beer samples were presented to each panelist in a random presentation order, and samples were blind coded with labels of random three (3) digit numbers. Each beer sample was served as a 90 ml (~3 oz) sample in a 240 ml (~8 oz) clear serving glass. Panelists were instructed to scale hop flavor attributes on a scale from 0 to 10. Paper ballots were used to record panelist's observations, collated in Excel, and statistical analyses were performed using XLSTAT (Addinsoft version 2015.5).

It was found that beer crafted using the inventors' $CO_2$ enriched oil extracts results in about double the flavor and aroma delivery on a (w/w) basis relative to beer crafted with standard extracts. It is contemplated that these superior results may be, at least in part, attributable to the greater concentration of hop oils in the beer from addition of the inventors' extracts relative to standard extracts. Further, it is contemplated that the improved flavor and aroma delivery provided by the inventive products is likely further promoted by the relative proportions of oil to alpha acids or other components in the inventors' extracts. Moreover, these superior results may be, at least in part, attributable to the reduced uncharacterized materials content in the inventors' $CO_2$ enriched oil extracts relative to standard extracts.

Additional efficiencies are realized by the present inventive products in shipping, storage, and reduced environmental impact associated manufacturing and labor costs are made possible because the flavor and aroma impact delivered to the beer by the inventors' $CO_2$ enriched oil extracts is far more concentrated than standard extracts.

2. Process for Making Extract Products

The inventors found that during the first part of the $CO_2$ extraction process, oils are preferentially extracted before the alpha acids and uncharacterized materials, which come off later during the extraction process. Thus, by selectively removing the first fraction of extract as the enriched oil extract of the present invention during the first part of the extraction process as described herein, a fraction containing a much higher percentage of oils (about two to three times higher) and a much lower percentage of alpha acids or uncharacterized materials is possible. By contrast, standard or conventional $CO_2$ extraction processes are normally run for a maximum amount of time to ensure that the alpha acids yield is as great as possible.

In one embodiment, a first extraction is run at 2200 psi for 2 hours to obtain the first fraction comprising the enriched oil hop extract. Generally, enriched oil hop extracts of the present invention may comprise extraction products wherein most of the hop oils present in the starting hops materials are extracted in a first extraction.

In one embodiment, the current invention parameters create oil enriched hop extract products under $CO_2$ extraction pressures between about 1600 psi and about 3700 psi, or at about 2200 psi and, optionally, does so at 48° C.

The first fraction is taken from the first two hours' worth of extraction material produced. This first fraction effectively accounts for about 50% of the total weight of extract that is produced; meanwhile the other 50% by weight of extract that remains to be extracted serves as the second fraction.

One embodiment of the present invention subjects a hop material to a low starting pressure to produce a first extraction fraction, increases pressure to produce a second extraction fraction from the same hop material, and, thus, produces one or more extract products while also taking advantage of the greater extraction efficiency inherent with supercritical/high pressure extraction.

Another preferred embodiment of the present invention comprises: extracting a hop material at low pressure, e.g., with $CO_2$ in a liquid or sub-critical state; running the low pressure extraction for a period of time to produce a first extraction product; increasing the extraction pressure to a high pressure, e.g., supercritical state; running the high pressure extraction for a period of time to produce a second extraction product; and finishing the extraction. The first extraction product and the second extraction may be maintained as separate products.

A preferred embodiment of the present invention comprises: extracting a hop material at low pressure, e.g., with $CO_2$ in a liquid or sub-critical state. For example, low pressure would start at 75 psi at −56.6° C. and that liquid state continues as temperatures and pressures increase; however, $CO_2$ reaches a critical point of 1070 psi at 31.1° C. and is considered to be in a supercritical status as pressures and temperatures continue to increase. This helps to reinforce the extraction of more desirable oils and aroma/flavor compounds without the extraction of additional, otherwise uncharacterized materials such as waxes and resins. This process helps to reinforce that the tendency of liquid $CO_2$ to preferentially extract desirable oils first, which contributes to aroma and flavor compounds as well as alpha, beta, and uncharacterized soft resins without the further extraction of more hard resins and tannins.

In a particularly preferred embodiment, for maximum yield and efficiency, extraction conditions for the inventors' $CO_2$ enriched oil extracts is about 2200 psi at about 48° C. for about 2 hours to obtain the first fraction enriched oil hop extract of the present invention. This first two hours will represent about 50% of the total extract weight. The remaining portion of the total extract weight will be fractionated from the second fraction which will see its pressure increased to about 3700 psi at about 48° C. until the extraction is completed, which is typically between about 2 and about 3 hours after the first fraction is obtained.

Other embodiments of this invention may comprise a first fraction $CO_2$ extract produced at pressures ranging from about 1200 psi to 5000 psi, or from about 1,600 to about 3,700 psi. Such extractions may occur at a temperature of about 48° C.

Still other embodiments involve running a low pressure extraction for a period of time; increasing the extraction pressure to a high pressure, e.g., supercritical state, and then running the high pressure extraction for a period of time; and finishing the extraction. Some suitable ranges for time and pressures for these other embodiments include about 1600 psi extraction rate at about 48° C. for about 4 to 5 hours to obtain about 25% by weight of extract of first fraction, which will then be increased to about 3700 psi at about 48° C. for about 2 to 4 hours to complete collection of the second fraction of extract. Additionally, extraction at about 3700 psi at about 48° C. for about 1 to 2 hours to obtain about 50% by weight of extract of first fraction, followed by continued extraction under the same parameters for about 2 to about 3 hours to obtain about 50% by weight of extract of second fraction. These two examples are shown as possible preferred steps across supercritical CO2 extraction process parameters.

Further embodiments include, but are not limited to fractionation of first fraction and second fraction between about 1200 and about 5000 psi, ranging in splits from about 10% to about 90% of first fraction extract by weight to about 10% to about 90% of second fraction extract by weight. For example, total extraction weight ratios for a hops starting material split between a first fraction and a second fraction, or a first fraction and any remaining fractions, may be about 10:90; 15:85; 20:80; 25:75; 30:70; 35:65; 40:60; 50:50; 55:45; 60:40; 65:35; 70:30; 75:25; 80:20; 85:15; 90:10; 95:5.

It is contemplated that lower pressure extraction and lower percentage cuts may be used as products of the present invention. For example, the Cascade hop variety may be used with lower pressures and possibly a 25:75 split.

In a preferred embodiment, the $CO_2$ extraction vessel is loaded with hop pellets for extraction. The extractor is closed and pressurized with $CO_2$ in the liquid or sub-critical state. The extraction is allowed to continue until anywhere from 10% to 90% of the projected extract has been collected and, optionally for about 20 minutes to about five hours. Typical extract of this projection might take anywhere from 20 to 30 minutes to six hours or more to collect. The pressure in the extractor is then increased to a supercritical state and the extraction is finished in about one to about five hours depending on the desired split. This embodiment may be used to produce two extract fractions.

Various extraction vessels may be used with the present invention. In one embodiment, the $CO_2$ extraction vessel may be, for example, an Uhde High Pressure Technologies GmbH extraction vessel having a design pressure of 350 Bar or 5076 psi and a design temperature of 149° C. or 300° F.

Production of extracts according to the present invention may include processes involving supercritical $CO_2$ extraction, sub-supercritical $CO_2$ extraction, liquid $CO_2$ extraction, or the many other known extraction technologies such as ethanol, hexane, or other organic extractions methods. Because the hop oils are generally extracted during the process preferentially above other compounds found in hops, the highest concentration of the hop oils will manifest in the extract taken during the earlier extraction times. Then, the hop extract coming off the earlier part of the process can be collected separately from the extract which comes off later in the process.

Additionally, if the $CO_2$ extraction process is conducted at lower pressures and temperatures than those under supercritical conditions, for example, below 1070 psi and 31.1° C., considered initial parameters for a supercritical fluid, the inventors found that oils are extracted at the beginning of the process even more preferentially. Unfortunately, the $CO_2$ extraction process at a lower pressure than supercritical can be far less efficient and requires either increased solvent flow, greater time, or other modifications to the feedstock or process that add increased expense to the extractor.

Here, the inventors have discovered how to conduct hops material extraction at a lower pressure for the period of time necessary to preferentially extract high oil extracts with alpha acid and uncharacterized materials profiles that are particularly well-suited to impart enhanced aroma and flavor to beer. Moreover, the inventors have identified a balance between maximizing the value obtained from a first high oil extract for enhanced aroma and flavor in beer from a starting hops material (whole cone, pellets, etc.) and obtaining still further value from additional extraction of the remaining starting hops material. Optionally, further extraction after a first extract is completed may be performed by increasing the extraction pressure and temperature to finish the extraction.

Additional process embodiments for making extract products according to the present invention are exemplified below and depicted in FIG. 1, FIG. 2, and FIG. 3.

FIG. 1 provides a flowchart of one process for the production of extraction products according to the present invention. This process may involve molecular distillation and further purification or isolation or hop oils from a second fraction obtained using 3700 psi. The purified or isolated hop oils from the second fraction may be added or blended back into the first fraction, which is represented at 2200 psi.

Figure 2:
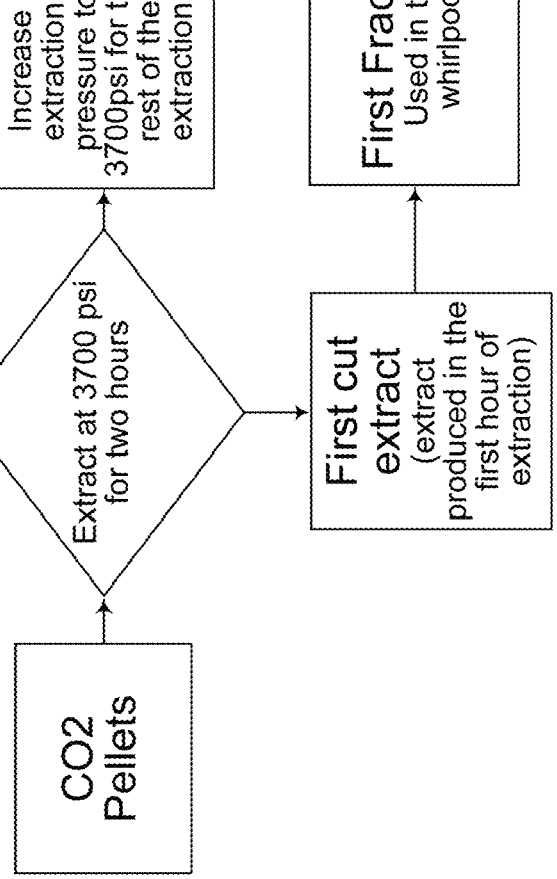
FIG. 2 depicts one embodiment of the present inventive process for making extract products.

FIG. 2 provides a flowchart of one process for the production of extraction products according to the present invention. Hop pellets are $CO_2$ extracted at 3700 psi for about two hours. A first fraction extraction product may be collected from this first pressure extraction. The first cut extraction product may be used in a whirlpool. After the first extraction, the hop pellets are $CO_2$ extracted at a higher pressure for additional time. A second fraction extraction product may be collected from this higher pressure extraction. The second fraction extraction product may be used as a variety specific bittering extract, sent to an AP advanced products facility (a hops extract plant capable of producing modified hop extracts, either through Isomerization, reduction, hydrogenation, or other chemical modification or separation techniques that produce product similar to, but not limited to, isomerized alpha acids, reduced isomerized alpha acid products, or other products not necessarily utilized significantly in the craft brewing markets at this time), or be made into another extract product, or blended together with the first cut extraction product.

Figure 3:
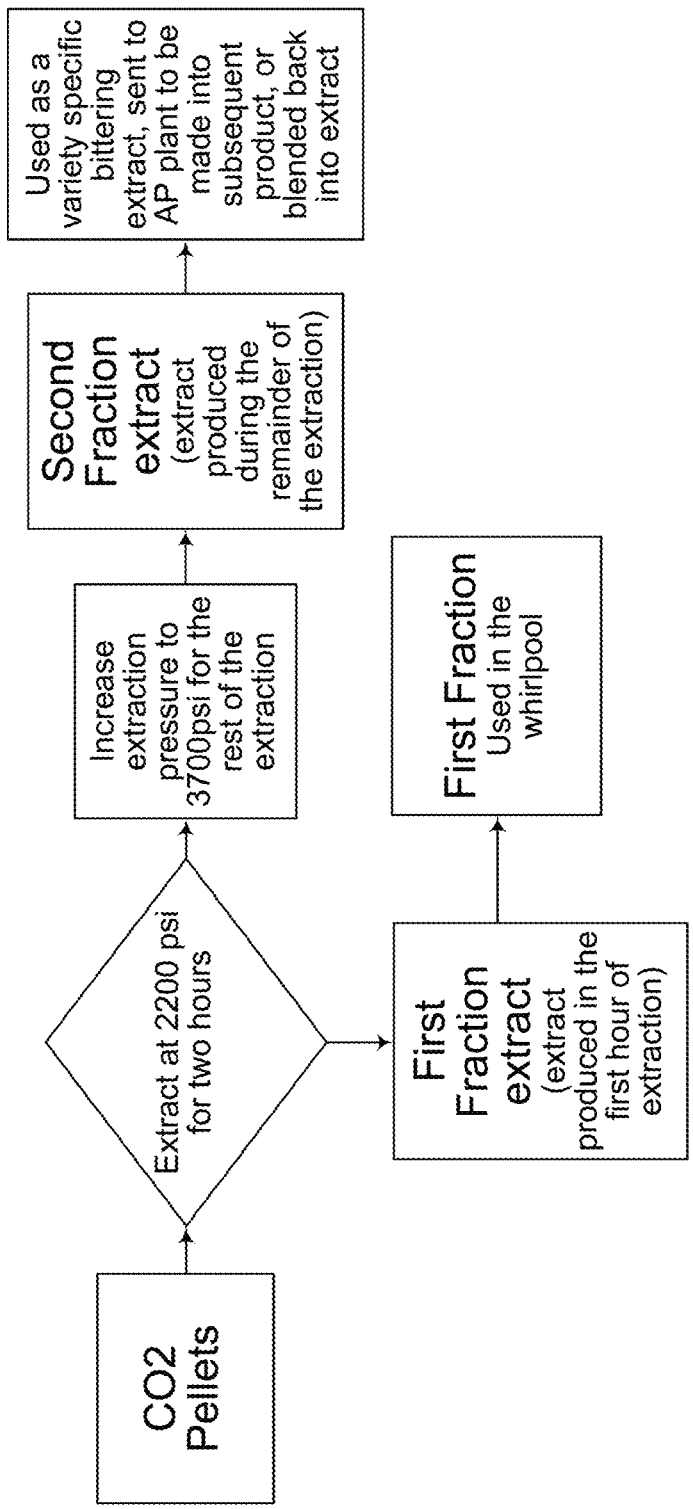
FIG. 3 depicts another embodiment of the present inventive process for making extract products.

FIG. 3 provides a flowchart of one process for the production of extraction products according to the present invention. Hop pellets are $CO_2$ extracted at 2200 psi for about two hours. A first fraction extraction product may be collected from this low pressure extraction. The first fraction extraction product may be used in a whirlpool. After the first extraction, the hop pellets are $CO_2$ extracted at 3700 psi for additional time. A second fraction extraction product may be collected from this higher pressure extraction. The second fraction extraction product may be used as a variety specific bittering extract, sent to an advanced products facility to be made into another extract product, or blended together with the first cut extraction product.

3. Process for Making Beer Using Products

Further the inventive products and processes described herein result in improved extract use efficiencies. For example, the present inventive products and processes may avoid or may not result in problems associated with uncharacterized materials, including wax, precipitation, etc. Because the inventive products and processes add only select hop compound extracts to beer, introduction of compounds into beer is also minimized.

Additionally, the inventors' $CO_2$ enriched oil extracts may exhibit enhanced dispersion in wort and, unlike standard extracts, it is recommended to be added much later in the boil, for example, at flameout or at any time after the hot process. In order to best preserve the aromatic and flavor output of this product, a range of about 50 to about 120 g/bbl is recommended. This number may be a conservative estimate and the number may actually encompass a range of about 20 to about 500 g/bbl depending on desired finished output.

While the recommended average use of enriched oil extracts at whirlpool ranges from about 50 g/bbl to about 120 g/bbl, the enriched oil extracts of the present invention may be applied in both lower and higher dosage rates with adequate results beyond this range. Good results have been achieved with amounts as little as about 40 g/bbl and as high as about 376 g/bbl. This range may even be realized to be wider upon further study.

Enhanced dispersion into wort has been visually observed and may be due to the reduced uncharacterized materials presence, including substances such as hard resin wax, in the high oil extracts produced using the extraction processes of the present invention. As described elsewhere herein, extraction to maximize oil, followed by adequate or acceptable extraction of alpha and beta and other soft resins is realized by the present invention. This process promotes production of a more flowable, oil rich product that may be better mixed into "hot side" wort, i.e. whirlpool, applications.

It is also noted that the present inventive extracts may comprise reduced uncharacterized materials which are typically found in higher pressure conventional supercritical $CO_2$ extractions and which can present processing and application difficulties in the brewery, such as clogging pumps, hoses, and associated equipment, as well as adherence to kettle walls during use.

Generally, under higher pressure and temperature parameters exhibited in standard supercritical $CO_2$ extraction as aforementioned, extraction of hard resins, tannins, and other uncharacterized resins from hops increases. Thus, because the invention has significantly less uncharacterized materials, including hard resin material, and is also more concentrated with desirable volatile hop oils than conventional extracts, the amount of hop uncharacterized materials transferred into the brewing process for the desired flavor and aroma impact is far lower than with standard extracts. This is even more the case for when hop oil extracts are added later in the boil or in the whirlpool because any uncharacterized materials are more likely to interfere with the brewing process. While many brewers would like to gain many of the well-known advantages hop extracts can provide to the brewer over pellet or whole cone hop additions, the difficulty caused by the precipitation of hop uncharacterized materials onto brewing equipment often prevents them from doing so.

In a preferred embodiment, the inventors' $CO_2$ enriched oil extracts would be used as late on the hot side of the brewing process as possible, preferably during the transfer of the wort into the whirlpool to maximize the transference of the flavor and aroma impacts of the product. In this way, the minimum of flavor and aroma compounds are lost due to the volatilization of those hop oil compounds while the wort is at the highest temperatures experienced during the brewing process.

In an embodiment of the present invention, either the first extract or the second extract may be added at any stage in the hot side for bitterness or flavor and aroma impact to the beer by brewers who desire an extract that will provide a flavor and aroma addition that is characteristic of a particular variety.

The $CO_2$ enriched oil extracts of the present invention, whether it be a first extract or a second extract or an extract supplemented with otherwise separated or purified material, may be used in a single beer production process, or may be individually used in separate beer processes. If the product extracts from a shared or common starting hop material are both used in a single beer production process, they may be introduced separately or in combination into the process, in sequential order, in turn, or upon achievement of various brewing production objectives in process as determined by, for example, a brewer, a machine, or software.

In one embodiment, the product extracts of the present invention may be added to the brewing process at the very end of the boil, or to the whirlpool.

However, in another embodiment of the present invention, the product could be used as an addition to the brewing process much later in the process, for e.g., during fermentation or even later (sometimes referred to as the "cold" side of the process). Use of the products extracts much later in the process may or may not involve some minor modification to the product extract. However, it is again noted that the lower concentration of uncharacterized materials in extracts of the present invention may render these inventive extracts particularly well-suited for cold side addition. But it is also expected that cold beer applications might require some form of ethanol or other dispersant to help facilitate use of the product extracts.

It is contemplated that, in one embodiment, the product extracts and processes of the present invention may be used on the cold side during the brewing process to deliver both the flavor and aroma characteristics of dry hopping or late hop additions to the brewing process while avoiding the loss of beer due to the adsorption of liquids inherent in the use of pellets. This use of the product extracts and processes of the present invention may thus provide a completely dispersible and soluble form of this aroma and flavor delivery that was heretofore only attainable by the use of hop pellets, or by the inefficient or problematic use of previously known hop extracts made from supercritical or liquid $CO_2$, ethanol, or other organic solvent extraction methods.

It is contemplated by the inventor that the inventive product extracts and processes disclosed herein can deliver the flavor and aroma impacts from hops to the beer in a way that has never been available to the brewing industry before.

The inventors found, based on various in-process brewing trials, that even when not factoring in perceived dry hopping gains, enriched oil hop extract of the present invention may still be used to replace 1.5 lbs/bbl of pellets in the whirlpool when used at a rate of 1 g/L. Further replacement gains may be realized at higher usage levels of the invention; however this upper limit is being researched further One embodiment of the present invention is a method of using a $CO_2$ enriched oil extract to deliver one of enhanced aroma and flavor to beer comprising: adding a $CO_2$ enriched oil extract during brewing. This method may further include the step of adding the $CO_2$ enriched oil extract at one of the very end of the boil or to the whirlpool. This method may further include a $CO_2$ enriched oil extract that has an oil content of between about 6-40 mL/100 g. Alternatively, this method may further include a $CO_2$ enriched oil extract that has an oil content greater than about 40 mL/100 g. This method may further include a $CO_2$ enriched oil extract that has an uncharacterized materials content between about 0.0% and 4.0%. This method may further include a $CO_2$ enriched oil extract that has an alpha acids content between about 15% and 55%. This method may further include a $CO_2$ enriched oil extract that has a viscosity less than about 1-3 Pas at 30-40° C. This method may further comprise the step of imparting one of enhanced aroma and flavor to beer. This method may further comprise the step of avoiding over bittering of beer.

In another embodiment, the present invention is a method of making a $CO_2$ enriched oil extract having an oil content of between about 12-40 mL/100 g. In still another embodiment, the present invention is a method of making a $CO_2$ enriched oil extract having an oil content greater than about 40 mL/100 g. This method may further include a $CO_2$ enriched oil extract that has an uncharacterized materials content between about 0.0% and about 3.0%. This method may further include a $CO_2$ enriched oil extract that has an alpha acids content between about 15% and 55%. This method may further include a $CO_2$ enriched oil extract that has a viscosity less than about 1-3 Pas at 30-40° C.

In another embodiment, the present invention is a $CO_2$ enriched oil extract product having an oil content of between about 15-40 mL/100 g. This product may further include an uncharacterized materials content between about 0.0% and 2.0%. This product may further include an alpha acids content between about 15% and 55%. This product may further have a viscosity less than about 1-3 Pas at 30-40° C.

In an alternative embodiment, the present invention is a $CO_2$ enriched oil extract product having an oil content greater than about 40 mL/100 g. This product may further include an uncharacterized materials content between about 0.0% and 4.0%. This product may further include an alpha acids content between about 15% and 55%. This product may further have a viscosity less than about 1-3 Pas at 30-40° C.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

EXAMPLES

Example 1

Sensory Outcomes of $CO_2$ Hop Extract Vs. Enriched Oil First Extract Products, of the Present Invention Introduction:

The presented trials explore the comparisons of using four different CITRA supercritical $CO_2$ hop extracts made under varying pressures and extraction parameters as a means of delivering efficient flavor and aroma in beer. These trials are summarized in Tables 5 and 6. Historically, brewers have used supercritical $CO_2$ hop extracts as an early beginning of boil (typically 60-90 minute boils) kettle bittering addition, due to their high 35→50% alpha acid concentrations depending on hop variety. More recently, as brewers have become more conscious of yield savings and hot-side efficiencies out of the kettle, supercritical $CO_2$ hop extracts have been explored at later addition points late in the boil process in the kettle and whirlpool in effort to achieve optimal flavor and aroma without losing wort volumes due to vegetative liquid absorption presently seen in hop pellets or cones. The present inventors have found that 1 kg of hop pellets has the ability to soak up 10 L of liquid.

Materials and Methods:

Four separate 230 L trial beers were brewed to target 40 IBU at 12° P. All trial beers were made comprising of 97% pale malted barley and 3% acidulated malt to produce 12° P wort. For all four trials, the four CITRA supercritical $CO_2$ extracts (Table 3) being explored were first extract products added to the whirlpool at the end of a 60 minute boil for a 60 minute whirlpool residency time prior to fermentation. Each beer was fermented with Wyeast 1056 Ale Yeast under 18° C. fermentation temperature. These beers were fermented for 12 days until 2° P or completion and subsequently conditioned and prepared in kegs for analysis by a sensory panel.

To determine if the beers were significantly different from each other, a series of Triangle Tests were performed in pairwise comparisons. The beer samples compared were as follows: 2200 psi $CO_2$ vs. 3700 psi $CO_2$ extracts, 2200 psi $CO_2$ extract vs. 2200 psi enriched oil hop extract, 3700 psi $CO_2$ extract vs. 3700 psi enriched oil hop extract, and 2200 psi enriched oil hop extract vs. 3700 psi enriched oil hop extract.

The Triangle Test was conducted following method ASBC Sensory-7 Triangular Test. A subset of the John I Haas trained sensory panel, 12 members, was available for this sensory study. In each Triangle Test panelists were given three blind samples, consisting of two samples of A and one sample of B. Samples were presented in a random order and blind coded with 3 digit number labels. Samples were beer served as a 90 ml (~3 oz) sample in a 240 ml (~8 oz) clear serving glass. Panelists were instructed to identify the odd sample. Correct and incorrect responses were recorded. With a sample size of 12, at least 8 correct answers are needed to establish a significant outcome and conclude that two samples are significantly different with a confidence level of $\alpha<0.05$.

After Triangle Testing, all samples were rated in Descriptive Analysis testing to determine more specifically how the beers differed in flavor. Following ASBC method Sensory-10 Descriptive Analysis, beer samples were presented to each panelist in a random presentation order, and samples were blind coded with labels of random 3 digit numbers. Each beer sample was served as a 90 ml (~3 oz) sample in a 240 ml (~8 oz) clear serving glass. Panelists were instructed to scale each beer on hop flavor attributes on a scale from 0 to 10. Paper ballots were used to record panelist's observations and further statistical analysis was done in Microsoft's Excel.

TABLE 5

| Trial | Variety of Extract | Pressure of Extraction (psi) | Notes |
|---|---|---|---|
| 1 | CITRA 53.1% aa, 7.4% oil | 3700 | Extraction parameters comprised a supercritical $CO_2$ extraction at 3700 psi at 48° C. for 4 hours with no fractionation |

TABLE 5-continued

| Trial | Variety of Extract | Pressure of Extraction (psi) | Notes |
|---|---|---|---|
| 2 | CITRA 53.3% aa, 9.3% oils | 2200 | Extraction parameters comprised a supercritical $CO_2$ extraction at 2200 psi at 48° C. for 4 hours with no fractionation |
| 3 | Enriched oil hop extract CITRA 50.7% aa, 12.1% oils | 3700 | Fractionated extract where the first, more oil rich fraction was used. Extraction parameters comprised a supercritical $CO_2$ extraction at 3700 psi at 48° C. with fractionation of the first fraction at two hours described as the enriched oil hop extract. |
| 4 | Enriched oil hop extract * CITRA 48.3% aa, 14.5% oils | 2200 | Fractionated extract, where the first, more oil rich fraction was used, under lower pressure conditions. Extraction parameters comprised a supercritical $CO_2$ extraction at 3700 psi at 48° C. with fractionation of the first fraction at two hours described as Enriched oil hop extract |

* Reflects new supercritical $CO_2$ extract product.

It is noted that the enriched oil hop extract used in trial 4 was extracted at a lower pressure (2200 psi) than the enriched oil hop extract used in trial 3 (3700 psi), and that extraction at this lower pressure yielded a greater proportion of oil relative to alpha acids.

Figure 4:
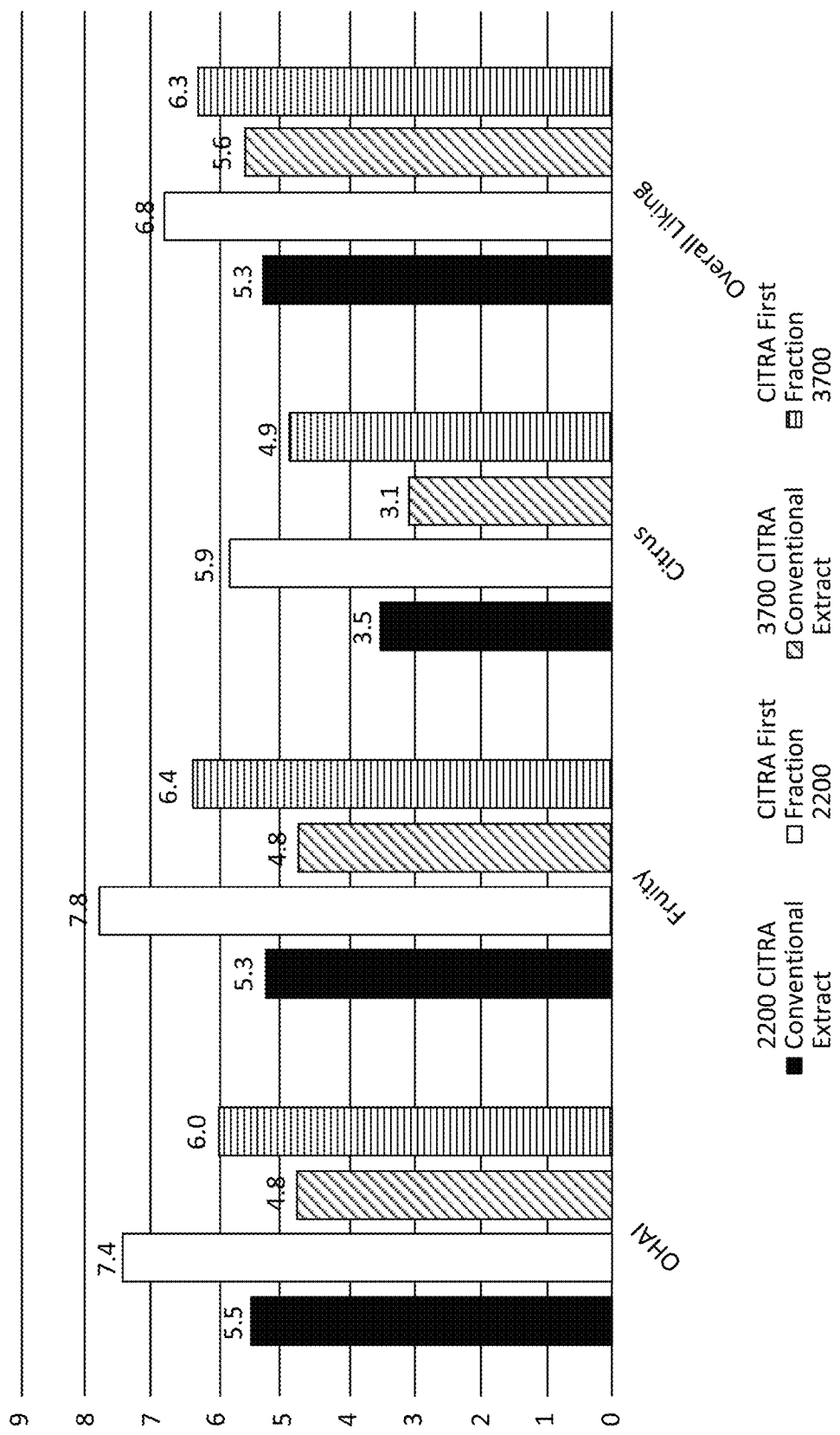
FIG. 4 provides a bar graph comparison of sensory scores for beers made with CITRA 2200 psi conventional extract, CITRA 2200 psi first fraction extract, CITRA 3700 conventional extract, and CITRA 3700 psi first fraction extract.

Discussion and Results:

Both Triangle and Descriptive analysis testing were conducted across the four trial beers that were brewed. Table 6 reflects the results from the triangle analysis test. FIG. 4 reflects the descriptive analysis findings from a sensory panel.

TABLE 6

| Table 6 Test # | Samples Compared | Sample Size (N) | Correct responses | Correct responses needed | Correct responses | Correct responses needed | Test Result | Significance Level α |
|---|---|---|---|---|---|---|---|---|
| 1 | 2200 vs. 3700 | 12 | 6 | 8 | 50% | 67% | Insignificant | NA |
| 2 | 2200 vs. 2200* | 12 | 12 | 8 | 100% | 67% | Significant | α < 0.001 |
| 3 | 3700 vs. 3700* | 12 | 8 | 8 | 67% | 67% | Significant | α < 0.05 |
| 4 | 2200* vs. 3700* | 12 | 9 | 8 | 89% | 67% | Significant | α < 0.01 |

*Reflects new supercritical $CO_2$ extract product.

Figure 5:
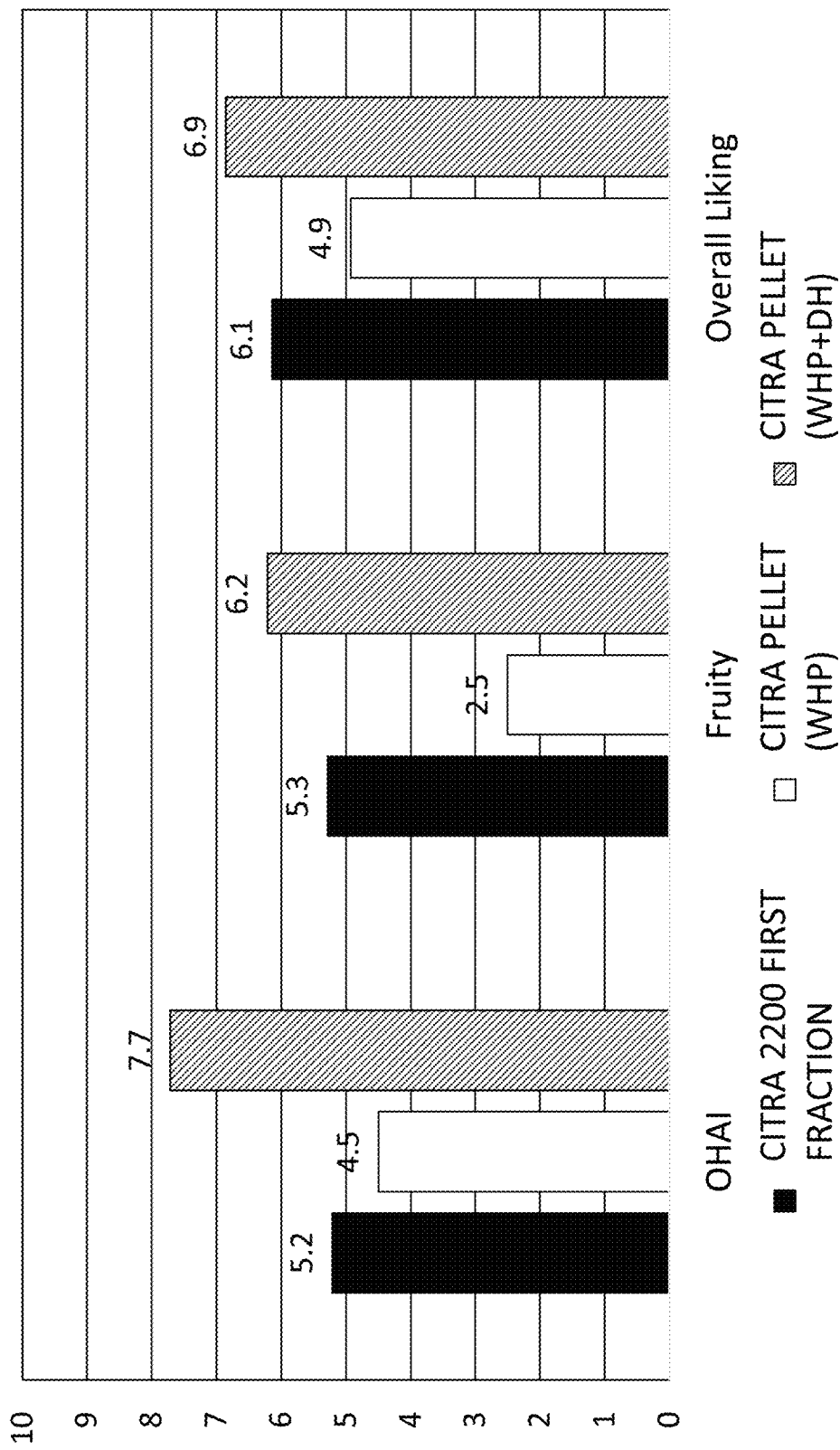
FIG. 5 provides a bar graph comparison of average sensory score for beers made with CITRA 2200 psi first fraction in the whirlpool, CITRA pellets in the whirlpool, and CITRA pellets in the both the whirlpool and dry hopping.

FIG. 5 shows a graph comparison of average sensory scores.

Results indicate that there was no significant flavor difference between CITRA 2200 and 3700 psi extracts. When comparing these two extracts to versions of enriched oil hop extract under the same pressure parameters, there was significant flavor difference in these sample comparisons. Enriched oil hop extract imparted nearly twice the Fruity and Citrus flavor and greater Overall Hop Aroma Intensity (OHAI) than conventional $CO_2$ extracts. Further, when comparing enriched oil hop extract 2200 vs enriched oil hop extract 3700, there was a significant flavor difference between these samples as well, reflected in higher scores for OHAI, Citrus, Fruity, and Overall Panel liking of the finished beer.

Conclusions:

CITRA enriched oil hop extract 2200 psi and enriched oil hop extract 3700 psi extracts outperformed conventional $CO_2$ extract under the same pressures, exhibiting more OHAI, more Fruity and Citrus flavors, and greater sensory panel liking.

CITRA enriched oil hop extract 2200 outperformed CITRA enriched oil hop extract 3700 extract, exhibiting more OHAI, more Fruity and Citrus flavors, and greater sensory panel liking. Looking at Table 5, it is possible that the increased levels of oil % in CITRA enriched oil hop extract 2200 lead to the largest hop flavor in the resulting beer, which was perceived by the panel as having more Fruit, Citrus, and a more likeable flavor. In our brewing trials 2200 psi enriched oil hop extract has delivered more flavor than 3700 psi enriched oil hop extract in sensory testing, and the exact chemical components responsible for this sensory impact gain are not currently known but are the subject of further research.

Example 2

Sensory of CITRA Pellets Vs. CITRA Enriched Oil Hop Extract in Whirlpool

Introduction:

The presented trials look at sensory comparisons of CITRA Pellets to CITRA enriched oil hop extract when used in the whirlpool when comparing on the basis of alpha acids content. Additionally, this study further compares sensory analyses of CITRA enriched oil hop extract whirlpool and dry-hopped pellet beer. The overarching goal of these comparisons is to better understand what enriched oil hop extract can potentially offer a brewer who uses this product over hop pellets.

Materials and Methods:

Three separate 230 L trial beers were brewed at the Haas Innovations Brewery to target 40 IBU at 12° P. For each, the CITRA Pellets, the CITRA Pellets and Dry Hop, and CITRA enriched oil hop extract were added to the whirlpool at the end of boil for a 60 minute residency time prior to fermentation. Each beer was fermented with Wyeast 1056 Ale Yeast under 65° F. fermentation conditions. The CITRA Pellet and Dry Hop beer was dry hopped by addition of hop pellets for 96 hours at a rate of 1 lb/bbl under 16.5° C. fermentation conditions with yeast present. These beers were fermented for 12 days until 2° P or completion and subsequently conditioned and prepared in kegs for analysis by Haas' internal sensory panel. Table 7 below reflects the usage rate of pellets and enriched oil hop extract in whirlpool. Here, 1030 grams of pellets were used and 239 grams of enriched oil hop extract were used—a ratio of pellets to enriched oil hop extract of 4.3.

Table 8 reflects the calculated hop oil contribution of each beer. In these trial beers, 1.0 g/L of enriched oil hop extract replaced pellets at 1.1 (lb/bbl). That is, in a 230 L batch, with 239 g used of enriched oil hop extract, 239/230 yields 1.04 g/L, listed as 1.0 g/L for this trial. CITRA pellets added in a 230 L batch was 1030 g, or 4.47 g/L of pellets, when converting this pellet number to lb/bbl:

$$\left(\frac{1030 \text{ g}}{220 \text{ L}} \times \frac{1 \text{ lb}}{453.6 \text{ g}}\right) \times \frac{100 \text{ L}}{1 \text{ hL}} \times \frac{1 \text{ hL}}{0.85 \text{ bbl}} = 1.1 \text{ lbs/bbl.}$$

TABLE 7

| Beer Trial | Amount added at Whirlpool |
| --- | --- |
| CITRA enriched oil hop extract | 239 g |
| CITRA Pellets | 1030 g |
| CITRA Pellets w/Dry Hop | 1030 g |

TABLE 8

| Beer Trial | Oil Contribution (ml/hl) |
| --- | --- |
| CITRA enriched oil hop extract (WHP) Whirlpool | 6.4 |
| CITRA Pellet (WHP) Whirlpool | 7.9 |
| CITRA Pellet (WHP + DH) Whirlpool and Dry Hop | 14.6 |

Figure 6:
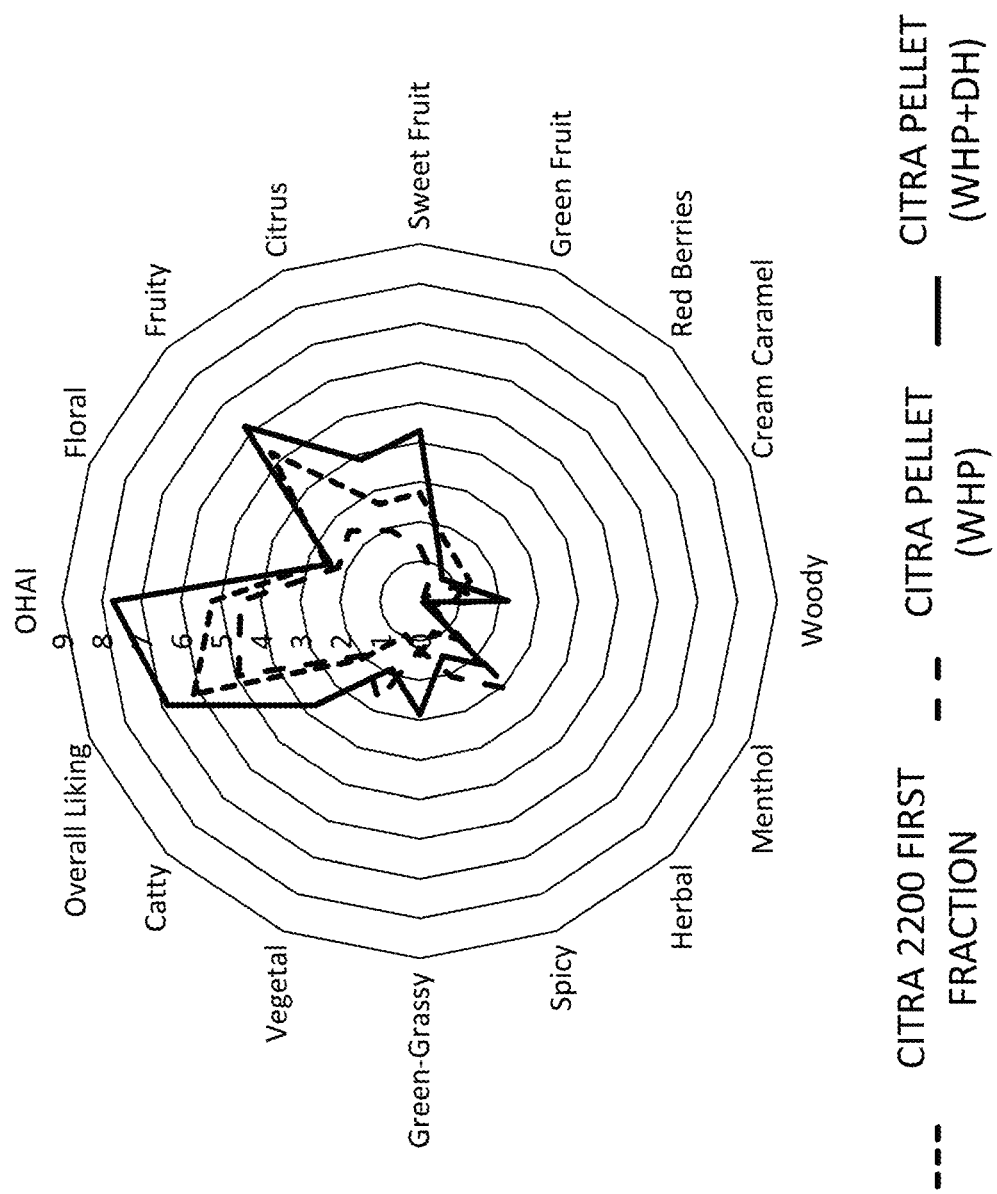
FIG. 6 provides a web graph comparison of average sensory scores for beers made with CITRA 2200 psi first fraction, CITRA pellets in the whirlpool, CITRA pellets in both the whirlpool and dry hopping.

Discussion and Results:

Both Triangle and Descriptive analysis testing were conducted across the trial beers that were brewed. FIG. 5 reflects the results of the key sensory scores comparing key sensory attributes. FIG. 6 reflects a more comprehensive sensory spider chart comparing the three trials conducted. Results from the triangle test indicated that 12 of 17 panelists could distinguish enriched oil hop extract and pellet beer, indicating a significant flavor difference between these beers. The enriched oil hop extract beer had greater OHAI and Fruity scores despite having less oil than the Pellet (WHP) beer, 6.4 vs. 7.9 ml/hl. This suggests that enriched oil hop extract has a better hop oil utilization rate than pellets. This indicates that when used under the same addition parameters, enriched oil hop extract potentially brings more volatile flavor/aroma active oils to finished beer, resulting in a more flavorful and aromatic end product. Results further indicate that enriched oil hop extract had significantly more flavor impact than pellets in the whirlpool, imparting more than twice the fruity flavor as pellets in the whirlpool. Enriched oil hop extract flavor was closer overall to dry hopped beer flavor than pellets in the whirlpool.

Conclusions:

At a rate of 1 g/L, CITRA enriched oil hop extract had greater OHAI and Fruity sensory scores and greater overall liking than the CITRA pellet beer. Results indicate that CITRA enriched oil hop extract flavor was closer to dry hopped beer flavor than the CITRA pellet beer that only used whirlpool hops. The present embodiment of enriched oil hop extract is an oil-rich extract that is meant to be added in the brew kettle on the "hot side" at late additions, i.e., to the whirlpool in order to maximize flavor and aroma in finished beer. This extract, if used on the "cold side" in a dry hopping format may result in extract that precipitates out of cold beer and does not readily solubilize.

Example 3

OHAI Sensory of CITRA Pellets Vs. CITRA Enriched Oil Hop Extract

Introduction:

The presented trials look at sensory comparisons of beer made using CITRA Pellets to CITRA enriched oil hop extract when used in the whirlpool and when comparing on the basis of alpha acids content. Additionally, this study further compares Overall Hop Aroma Intensity sensory of CITRA enriched oil hop extract to a CITRA pellet beer. Subsequently, these beers were dry hopped at varying rates in order to determine the flavor and aromatic impact of a beer that uses Enriched oil hop extract versus that of pellets. The overarching goal of these comparisons is to better understand what enriched oil hop extract can potentially offer a brewer who uses this product over hop pellets.

Materials and Methods:

Two separate 230 L trial beers comprising of 97% pale malted barley and 3% acidulated malt were brewed to target 40 IBU at 12° P. For each, the CITRA Pellets and CITRA enriched oil hop extract (1 g/L) were added to the whirlpool at the end of 60 minute boil for a 60 minute whirlpool residency time prior to fermentation. Each beer was fermented with Wyeast 1056 Ale Yeast under 18° C. fermentation conditions. These two trials were then split 6 ways (4 Enriched oil hop extract; 2 Pellets) and dry hopped at varying rates in order to determine potential dry hopping impact of enriched oil hop extract. Each dry-hopped iteration was conducted for 96 hours at various rates under 16.5° C. fermentation conditions with yeast present. These beers were fermented for 12 days until 2° P or completion and subsequently conditioned and prepared in kegs for analysis by a sensory panel. Sensory Analysis testing was conducted in a similar manner to previous trials. Triangle Tests was employed to determine if the beers were significantly different from each other, in a series of pairwise comparisons. The beer samples compared were as follows: Pellet vs. Extract, Pellet vs. Enriched oil hop extract, and Extract vs. Enriched oil hop extract.

The Triangle Test was conducted following method ASBC Sensory-7 Triangular Test. A subset of the trained sensory panelists, 23 members, was available for this sensory study. In each Triangle Test, panelists were given three blind samples, consisting of two samples of A and one sample of B. Samples were presented in a random order and blind coded with 3-digit number labels. Samples were beer served as a 90 ml (~3 oz) sample in a 240 ml (~8 oz) clear serving glass. Panelists were instructed to identify the odd sample. Correct and incorrect responses were recorded. With a sample size of 23, at least 12 correct answers are needed to establish a significant outcome and conclude that two samples are significantly different with a confidence level of α<0.05.

After Triangle Testing, all samples were rated in Descriptive Analysis testing to determine more specifically how the beers differed in flavor. Following ASBC method Sensory-10 Descriptive Analysis, beer samples were presented to each panelist in a random presentation order, and samples were blind coded with labels of random 3 digit numbers.

Each beer sample was served as a 90 ml (~3 oz) sample in a 240 ml (~8 oz) clear serving glass. Panelists were instructed to scale each beer on hop flavor attributes on a scale from 0 to 10. Paper ballots were used to record panelist's observations and further statistical analysis was done in Microsoft's Excel.

Table 9 below reflects the usage rate of pellets and enriched oil hop extract in whirlpool along with the associated different dry hopping rates. In these trial beers, 1.0 g/L of enriched oil hop extract replaced pellets at 1.4 (lb/bbl). Here 940 grams of pellets were added and 174 grams of enriched oil hop extract was added—a ratio of pellets to Enriched oil hop extract of 5.4.

TABLE 9

| Beer Trial | Amount added at Whirlpool | Dry Hopping Rates |
|---|---|---|
| CITRA enriched oil hop extract | 174 g | 0 lbs/bbl |
|  |  | 0.25 lbs/bbl |
|  |  | 0.50 lbs/bbl |
|  |  | 0.75 lbs/bbl |
| CITRA Pellets | 940 g | 0 lbs/bbl |
|  |  | 1 lbs/bbl |

Figure 7:
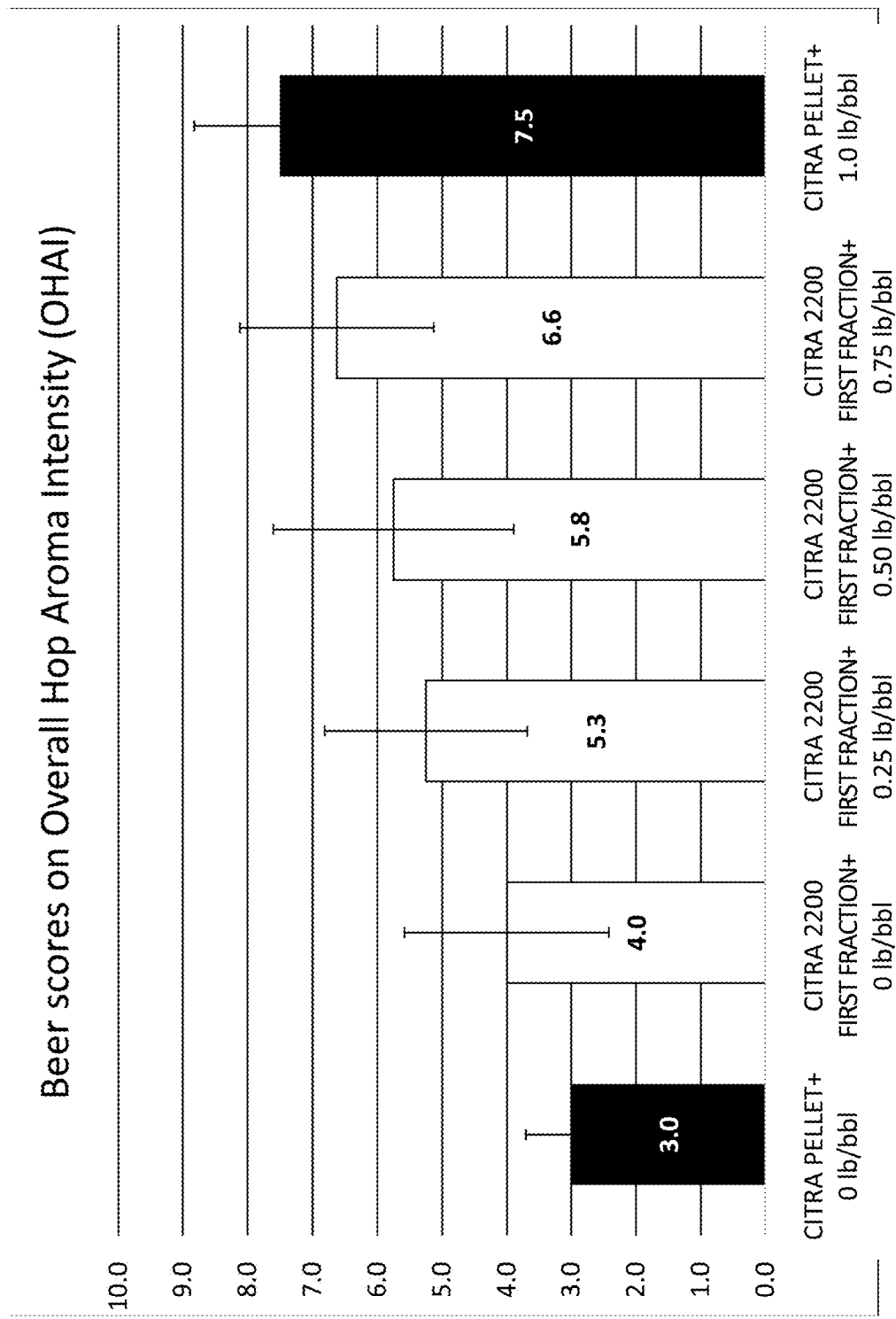
FIG. 7 provides a bar graph that reflects the results of the OHAI comparisons of all beers in the study.
Figure 8:
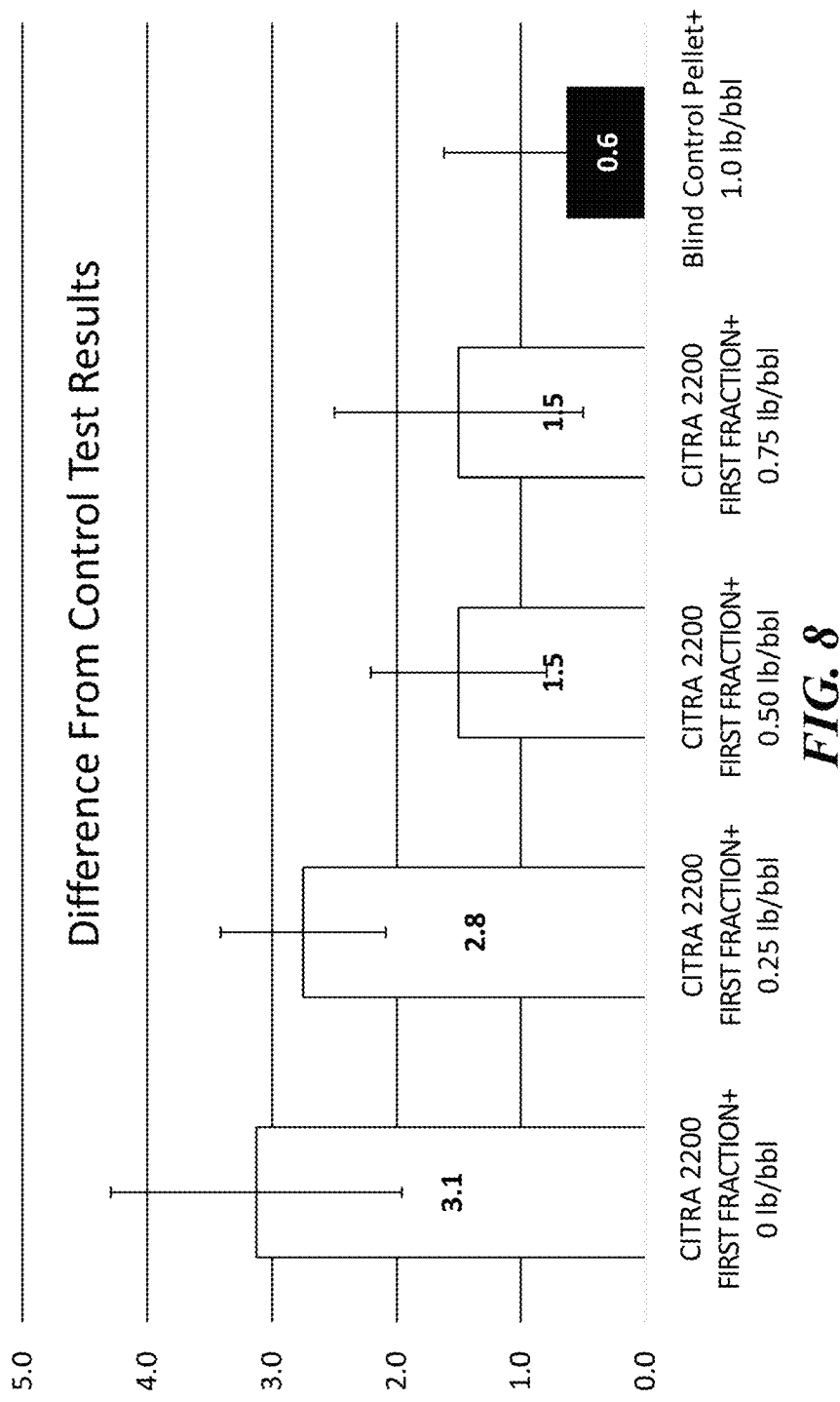
FIG. 8 provides a bar graph that reflects the sensory results from the difference from control tests of all beers in the study.
Figure 13:
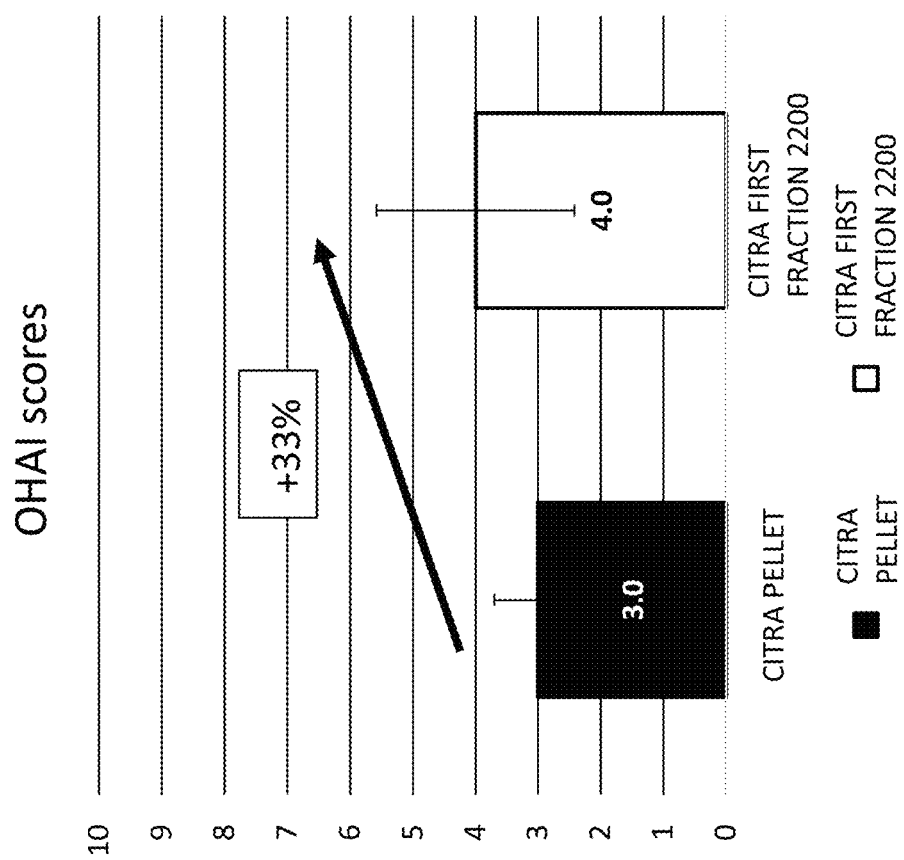
FIG. 13 provides a bar graph comparison of average sensory scores for beers made with CITRA pellet and CITRA first fraction 2200 psi extract. The results show a 33% increase in Overall Hop Aroma Intensity [OHAI].
Figure 14:
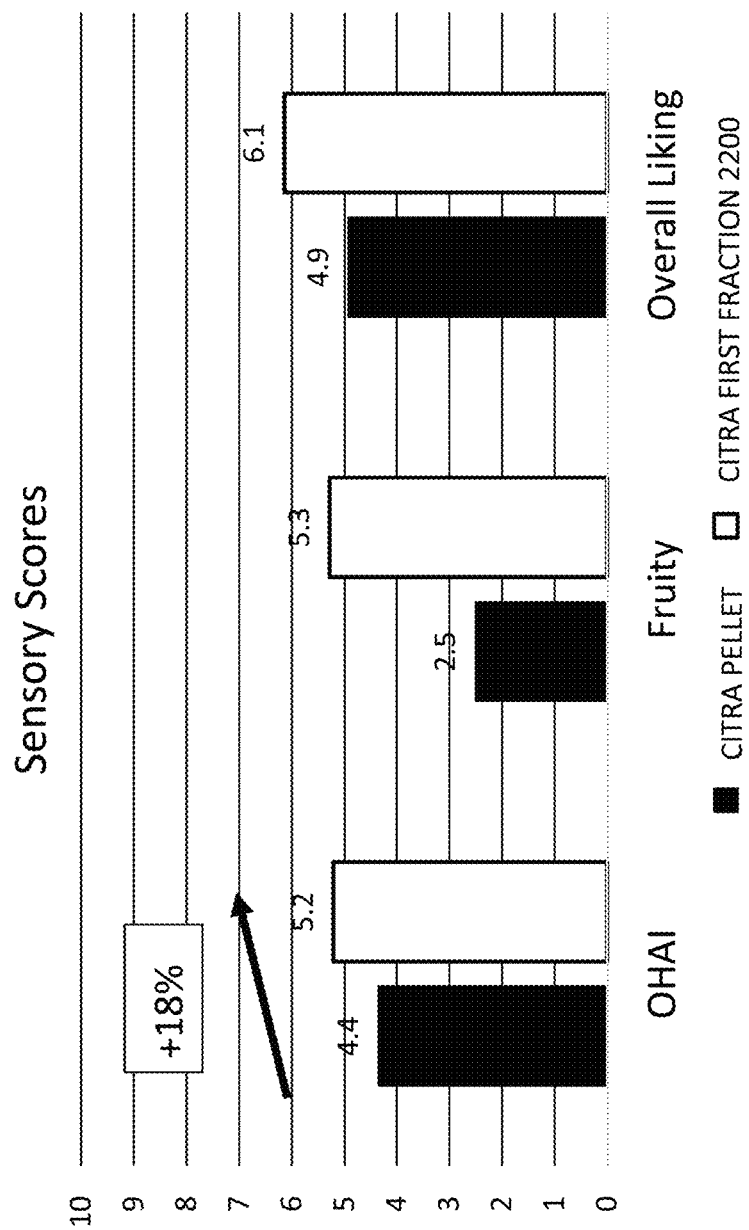
FIG. 14 provides a bar graph comparison of average sensory scores for beers made with CITRA pellet and CITRA first fraction 2200 psi extract. The results show an 18% increase in Overall Hop Aroma Intensity [OHAI].

Discussion and Results:

Both Difference from Control and Descriptive analysis testing were conducted across the trial beers that were brewed. FIG. 7 reflects the results of the OHAI comparisons of all beers in the study. FIG. 8 reflects the results from the difference from control tests. Evidence suggests that Enriched oil hop extract when used at a rate of 1 g/L consistently delivers higher OHAI than pellets. Additionally, OHAI of Enriched oil hop extract beers increases with dry hopping rates beyond 0 lbs/bbl. Regarding the difference from control tests, panelists rated both +0.50 lb/bbl and +0.75 lb/bbl as being similar to the pellet beer dry hopped with 1 lb/bbl. See, e.g., FIG. 13 and FIG. 14.

Conclusions:

There are many ways to quantify and approximate the flavor benefit of enriched oil hop extract. This particular study indicates that enriched oil hop extract delivers 0.25 lbs/bbl worth of dry hop flavor perception. This could mean that a brewer who is looking for dry hopping characteristics in their beer might not have to dry hop, especially if their equipment is not conducive to adding hops on the "cold side." Further, a brewer who is looking to reduce their dry hopping loads in the consciousness of yield savings but still maintain impactful flavor and aroma may also see benefits of using enriched oil hop extract's additional flavor benefit, however, this will depend on their usage level.

In this case, using 1 g/L rate of enriched oil hop extract and matching IBU contributions versus pellets, enriched oil hop extract delivers more flavor to beer than pellets when simply comparing to whirlpool, and also delivers an amplified perception that approaches the flavor and aroma of a pellet 1 lb/bbl dry hopped beer.

Results further substantiate that CITRA enriched oil hop extract flavor was closer to dry hopped beer flavor than the CITRA pellet beer that only used whirlpool hops.

These findings, along with other sensory studies, suggest that enriched oil hop extract when used at a rate of 1 g/L in the whirlpool replaces 1.5 lbs/bbl pellets in the whirlpool.

Example 4

Sensory Analysis of Haas Centennial Beers

A comparison of pellets, extract, and enriched oil hop extract.

Objective:

The objective of this study was to evaluate IPA beers using Centennial hops provided by a collaborative external brewer to test pellets vs. extracts and, additionally, to investigate whether the panelists can pick out flavor differences between pellet and extract beers. It is noted that there was not have enough beer to perform triangle testing. Another objective was to evaluate the internally produced Haas Centennial beers to test pellets vs. extract vs. enriched oil hop extract and to determine if there are flavor differences between the beers, and to determine if enriched oil hop extract can be used as a substitute for pellets and/or extract. A further objective was to evaluate the internally produced Haas Centennial beers at day 60 to compare the aging of the beers-pellet vs. extract vs. enriched oil hop extract and to measure the flavor has changed from day 0 to day 60.

Figure 9:
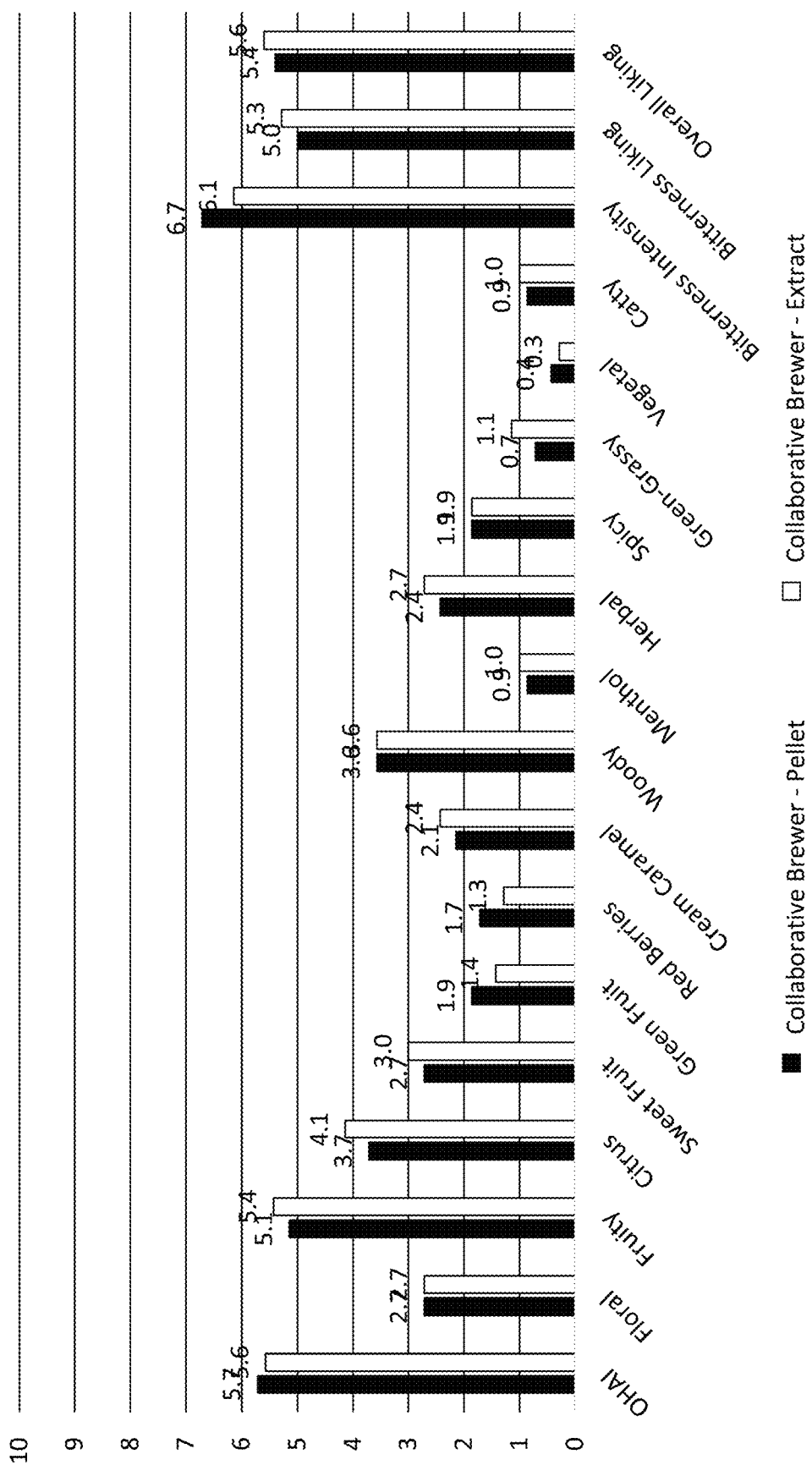
FIG. 9 provides a bar graph comparison of average sensory scores for beers made with Centennial pellets and conventional Centennial extract from collaborative external brewery.

FIG. 9 provides a graph comparing various beers. The panelists found no significant differences between the pellet and extract beers. The panelists noted some aging flavors, which masked the differences in flavor.

Figure 10:
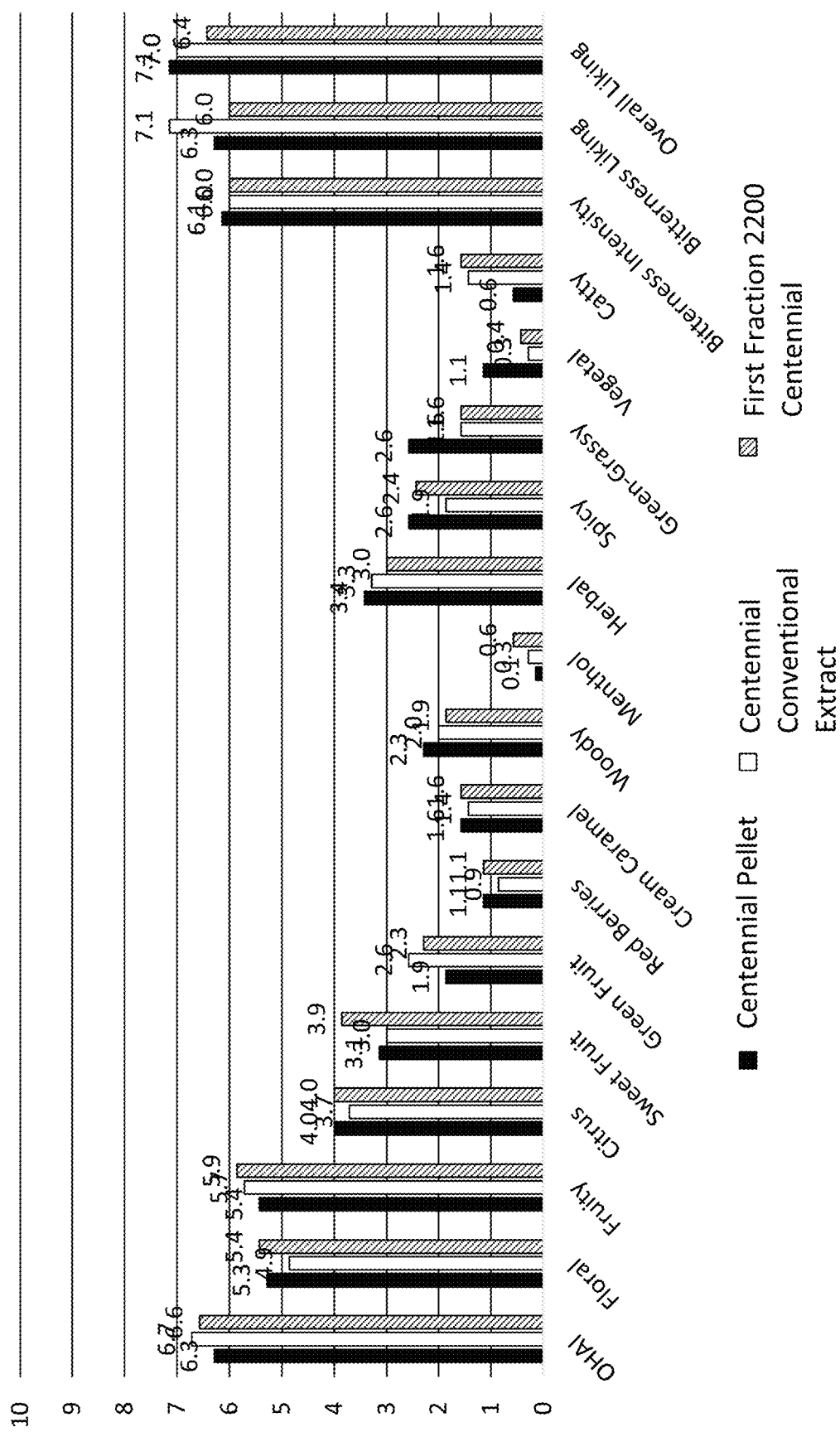
FIG. 10 provides a bar graph comparison of average sensory scores for beers made Centennial pellets, conventional Centennial extract, and first fraction 2200 psi Centennial extract.

FIG. 10 provides a graph comparing various beers. The panel found no significant differences between pellet, extract, and enriched oil hop extract. These results align with the triangle test results. The beers were very similar.

Haas Beers—Triangle Testing at Day 0 is summarized in Table 10.

TABLE 10

| Test # | Samples Compared | Sample Size (N) | Correct Responses (%) | Correct Responses Needed (%) | Test Result | Significance Level α |
|---|---|---|---|---|---|---|
| 1 | Pellet vs. Extract | 3 | 3% | 52% | Insignificant | NA |
| 2 | Pellet vs. Enriched oil hop extract | 3 | 3% | 52% | Insignificant | NA |
| 3 | Extract vs. Enriched oil hop extract | 3 | 7% | 52% | Significant | α = 0.04 |

No differences was found between Pellet vs. Extract and Pellet vs. Enriched oil hop extract. Test #2 was an unexpected result. This could mean that there is a threshold amount of enriched oil hop extract before a discernible difference between enriched oil hop extract and pellets may be appreciated; but it is noted that when enriched oil hop extract was used at lower level thresholds, it has never been outperformed by pellets. In these iterations, enriched oil hop extract has performed on par with pellets in terms of flavor and aroma. The beer in this study used a low level of enriched oil hop extract, about 40 grams per bbl, which was done purposefully to match IBUs. That is, the amount of pellets added to the whirlpool was about 192 grams; meanwhile, the amount of enriched oil hop extract added to whirlpool was about 41 grams—a ratio of pellets to enriched oil hop extract of 4.7.

As increased levels of enriched oil hop extract are used, the benefits from pellets are increasingly more realized.

In previous work, enriched oil hop extract was found to deliver significantly greater hop aroma to beer than pellets. However, the previous work was based on a higher dosage rate, i.e., the recommended dosage range is 50-120 grams per bbl. The optimum, preferred dosage ranges will differ from brewery to brewery depending on the desired flavor and aroma output that is desired.

Amount Added at Whirlpool

The low dosage may explain why we saw no difference between the pellet and enriched oil hop extract beers. Low dosage of enriched oil hop extract might help still facilitate yield savings in the kettle to some degree. At lower thresholds, enriched oil hop extract compared on par or better than pellets. Accordingly, even in instances where there isn't much of a flavor difference or aromatic difference when using low dosage levels of a first fraction enriched hop oil extract, a brewer might still see yield savings due to the fact that there is no vegetative material present to soak up any liquid as compared to pellets. At higher levels, first fraction outperforms pellets every time. Further, due to less vegetative material in the system, there might be added yield savings for the brewer.

Figure 11:
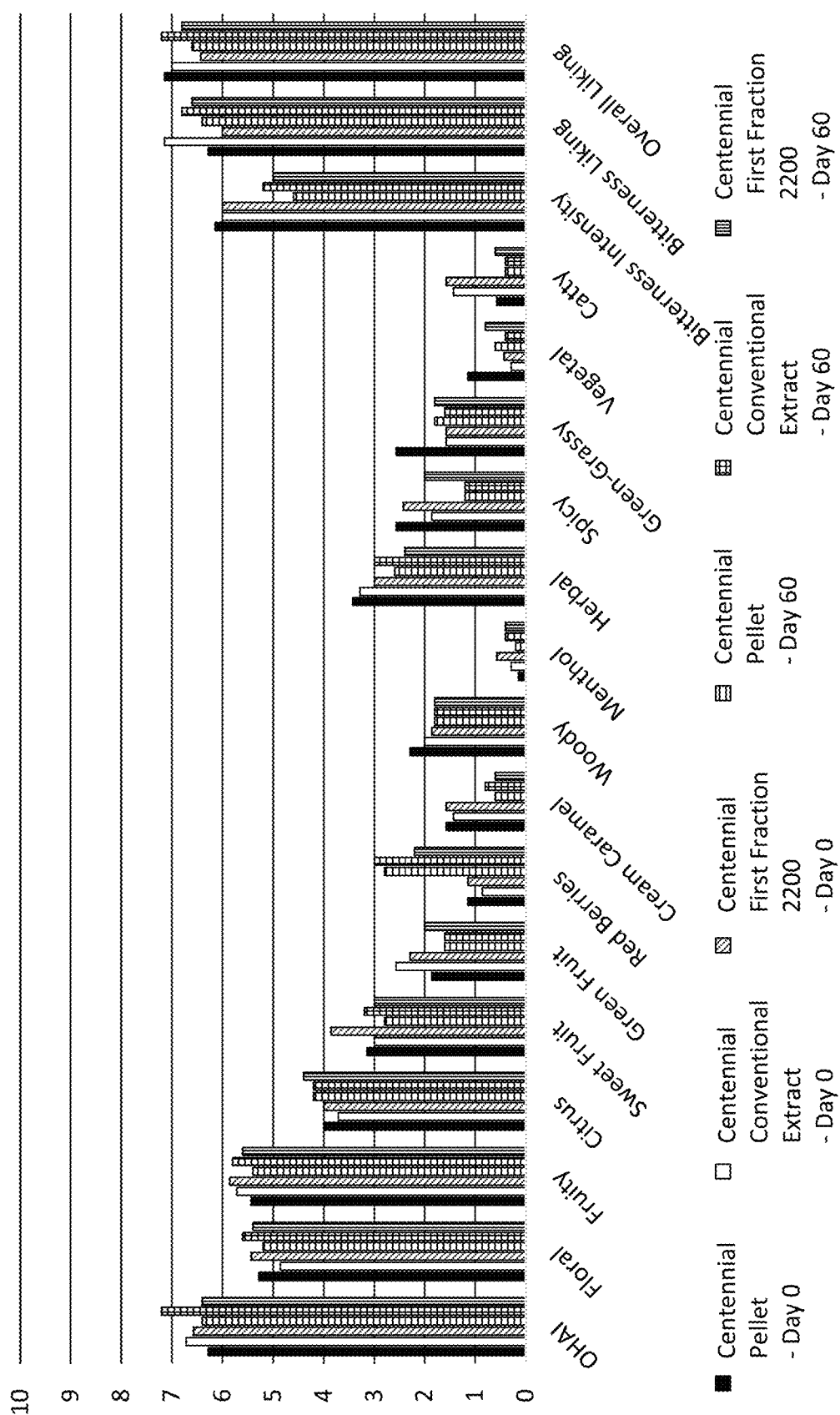
FIG. 11 provides a bar graph comparison of average sensory scores in a 0 vs 60 day aging study for beers made Centennial pellets, conventional Centennial extract, and first fraction 2200 psi Centennial extract.
Figure 12:
FIG. 12 is a photo of the beers and sensory ballot used in the descriptive analysis for the study described in Example 4.

Haas Beers—Flavor Day 0 vs 60 is shown by the graph provided in FIG. 11 and a photo of the descriptive analysis used for Haas beers is provided in FIG. 12. Minor differences were found between the Fresh and 60 day beers. Note: Day 0 and Day 60 beers were not compared side by side. This is a post hoc data comparison. Some differences in scores are likely attributable to panel variation between testing dates. Overall the flavor did not change substantially over 60 days.

In these beers, 1.0 g/L of enriched oil hop extract replaced pellets at 1.2 (lb/bbl).

Conclusions:

No significant differences were detected. Aging may have masked the differences. No significant differences were detected between Haas beers made with pellets, extract, and enriched oil hop extract. However, if a higher dosage level of enriched oil hop extract was used, we would expect significantly more aroma.

Centennial enriched oil hop extract worked as a substitution for pellets and extract in this recipe. Enriched oil hop extract, extract, and pellets aged similarly after 60 days. The day 0 and day 60 beers showed surprisingly few differences in flavor.

Example 5

Composite Sampling of Supercritical $CO_2$ Extraction of Columbus Hop Pellet

Introduction:

Supercritical $CO_2$ Extraction is the Process of Creating phase changes, utilizing temperature and pressure, in order to separate desirable materials. This solvent has the ability to become dense enough to drop out or carry different weighing components from the plant material. The collected material that has been separated from the plant material can occur with one extraction or fractionally. This method of extraction yields a clean, unaltered, and consistent-yet-flexible product.

The purpose of the trial was to understand which components of the hop material are being extracted at specific times throughout the extraction process, using Supercritical $CO_2$ Extraction of Columbus hop pellets.

Discussion and Results:

Supercritical $CO_2$ Extraction at 3700 psi and 50° C. is used for not only its efficiency in turnaround time, but because the high pressure is able to extract most of the essential hop components used for brewing while leaving behind most uncharacterized materials such as lipids and plant material. Traditionally, hop pellets or whole cones are boiled in the brew kettle, in order to utilize desirable hop components, such as alpha acids, beta acids and volatile oils, to flavor and bitter beer. $CO_2$ Hop Extract is used instead of pellets to make the brewing process slightly more efficient and less messy due to the lack of plant material, among other contributions.

The Supercritical $CO_2$ Extraction process took place using the five liter CF Technologies, LLC Supercritical $CO_2$ Extraction system which is housed inside the Flavor Factory. Liquid $CO_2$ was added from a fifty pound syphon tube cylinder to completely fill the working Storage Tank (V-1). First, 2.3 kilograms of $CO_2$ Hop Pellets were weighed out and these pellets were placed inside the extraction vessel (E-1). Second, the extraction vessel was sealed up then pressurized to 3700 psi at 50° C. using the flow regulator and the pump. The Separator (S-1) was pressurized to 900 psi, making sure it was at a higher pressure than the Storage tank (V-1) to prevent back flow. Separator pressure was determined to be held at 900 psi to ensure little to no carry-over of water and hop extract through the condenser and into storage tank. During extraction, temperatures to vessels E-1 and S-1 were held constant between 49-51° C. to ensure supercritical conditions and fluidity of the highly viscous hop extract, while the storage tank (V-1) held a cool temperature of 7° C. to 10° C. to keep the $CO_2$ in a liquid phase.

Figure 15:
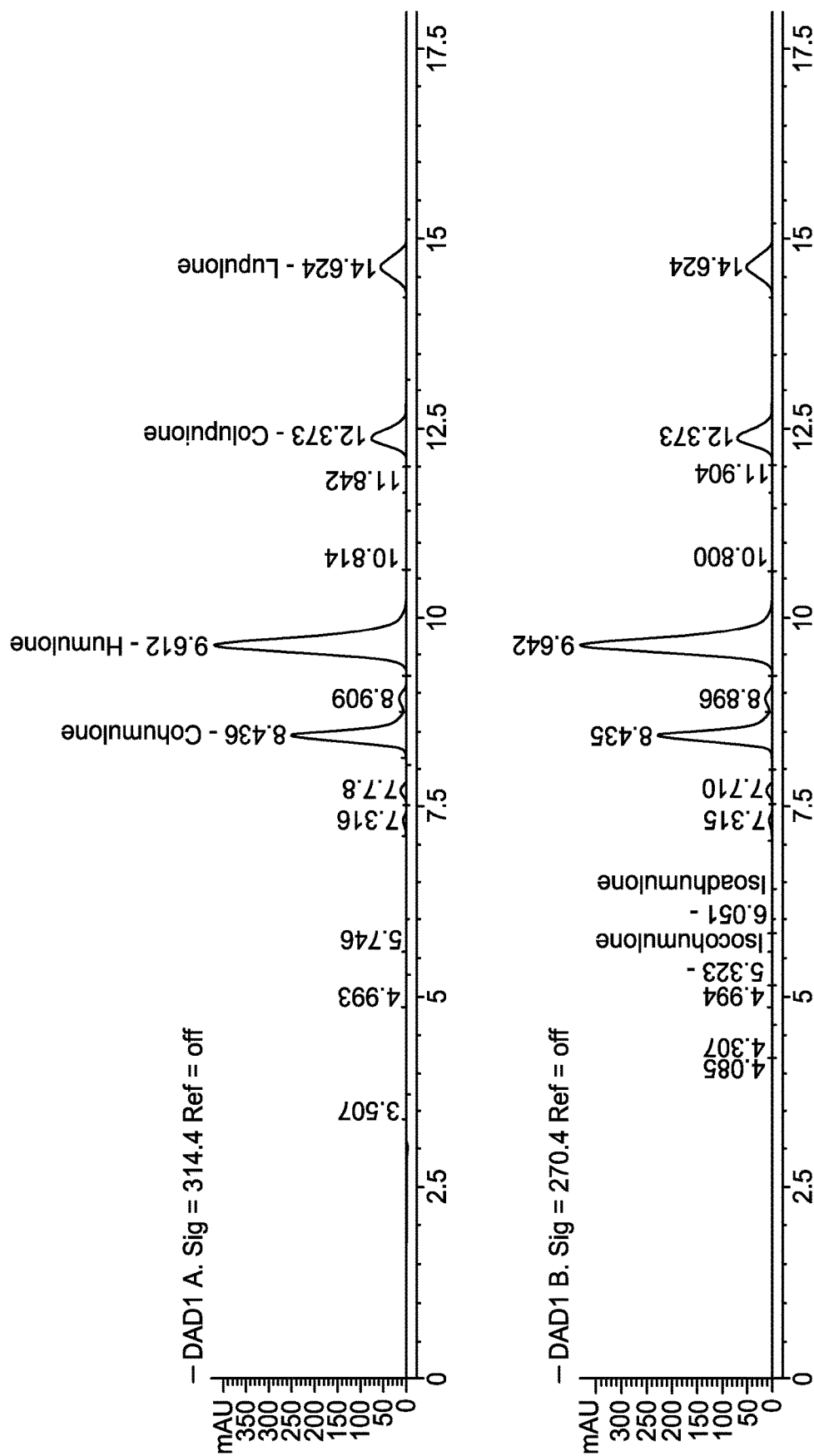
FIG. 15 provides HPLC chromatograms of 3700 psi Columbus hop extract at wavelengths 270 nm and 314 nm.
Figure 16:
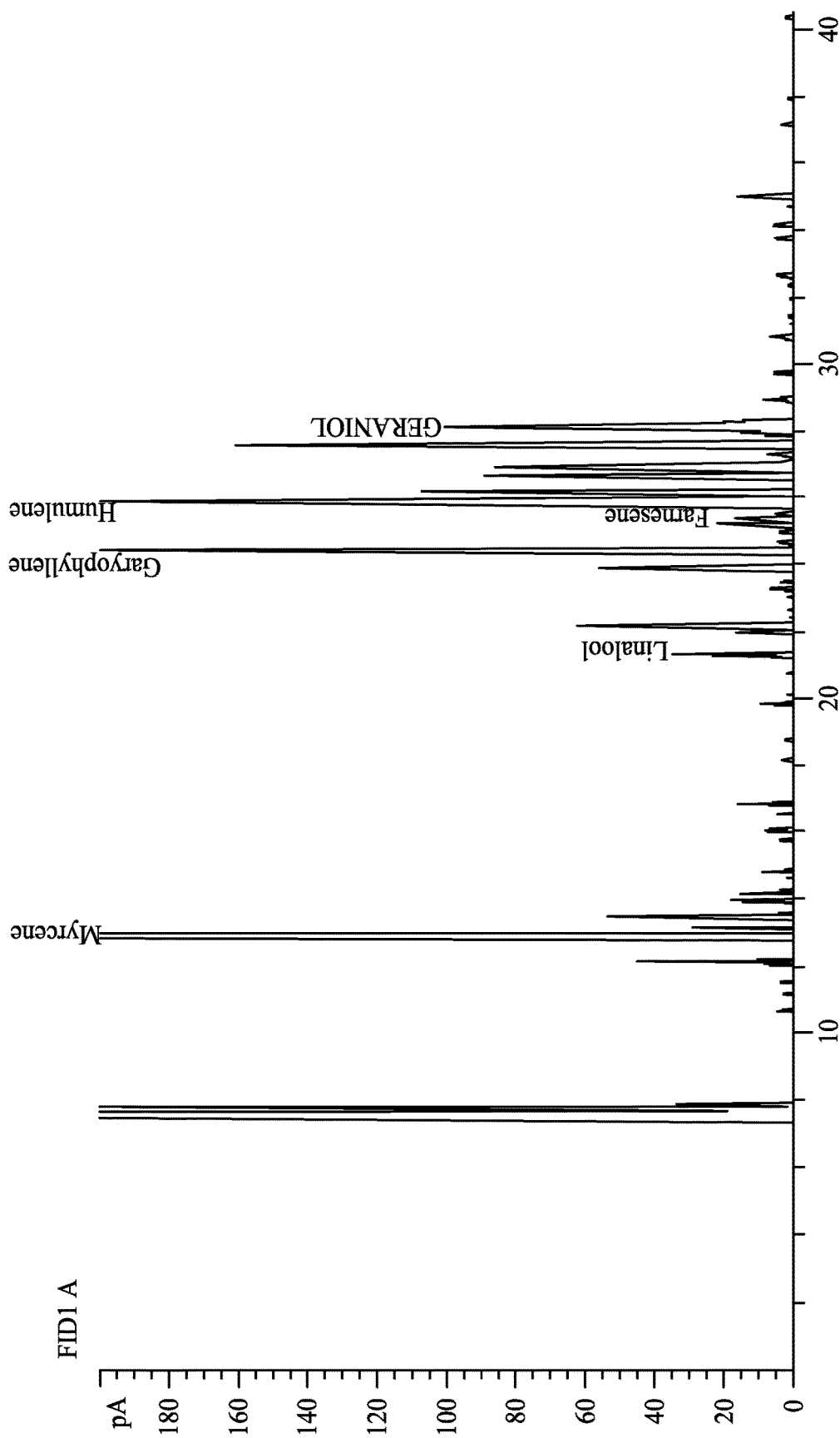
FIG. 16 provides GC-FID chromatogram of 3700 psi Columbus hop extract.

Columbus $CO_2$ Hop Extract was collected every half hour during the extraction. Final hop extract weight after four hours and thirty minutes was 552 grams which was 24% by weight of the starting hop pellet material (average for Columbus or other high alpha yielding varieties is 25% extract to starting pellet weight). FIG. 15 and FIG. 16 illustrate typical results for alpha acids, beta acids and oils of $CO_2$ Hop Extract of Columbus at 3700 psi.

Figure 17:
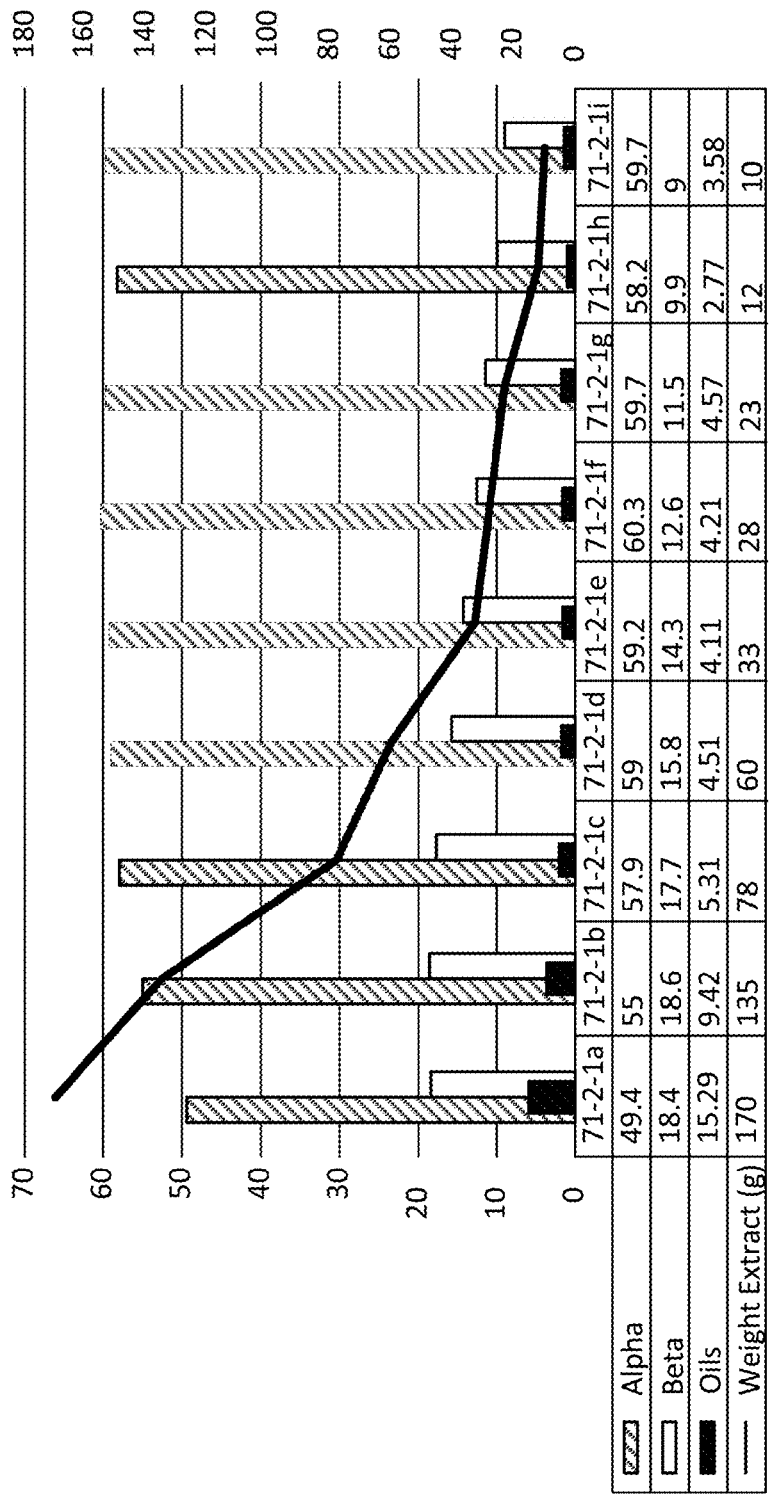
FIG. 17 provides a bar graph showing components of 3700 psi Columbus hop extract samples taken every 30 minutes during extraction.
Figure 18:
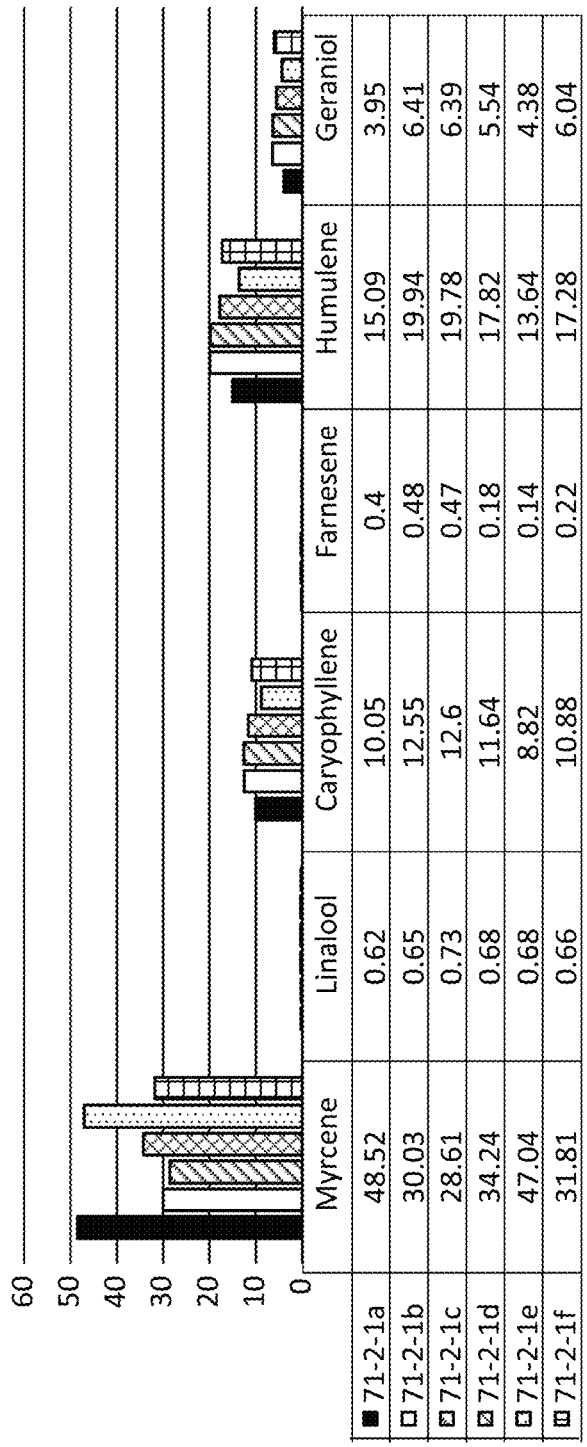
FIG. 18 provides a bar graph of hop oil components of 3700 psi Columbus hop extract samples taken every 30 minutes during extraction.

As the extraction took place, a separate sample of hop extract was collected and weighed each half hour. Once the four and a half hour extraction run was completed, all the samples were analyzed by High Performance Liquid Chromatography (HPLC) for hop acids concentrations and Gas Chromatography (GC) for the oils collected from steam distillation. Table 11 shows the amount of hop extract collected at each collection time during extraction, along with the results from HPLC and GC analysis. FIG. 17 helps depict what was extracted at the specific time, plus the amount of extract collected at a specific run time, while FIG. 18 illustrates the qualitative analytical data from the total oils collected from each sample. The alpha acids (Cohumulone and Humulone) and beta acids (Colupulone and Lupulone) peaks from FIG. 15 are found in FIG. 19, which breaks down the concentrations of alpha acids and beta acids.

Table 11. Extract samples were collected and analyzed for alpha, beta, and oil concentration. All samples taken after two hours and thirty minutes did not have enough oil collected by steam distillation to conduct GC analysis.

TABLE 11

| Extraction ID | Weight Extract (g) | HPLC Alpha | Beta | Total Oils | GC Myrcene | Linalool | Carophyllene | Farnesene | Humulene | Geraniol |
|---|---|---|---|---|---|---|---|---|---|---|
| 71-2-1a | 170 | 49.4 | 18.4 | 15.29 | 48.52 | 0.62 | 10.05 | 0.4 | 15.09 | 3.95 |
| 71-2-1b | 135 | 55 | 18.6 | 9.42 | 30.03 | 0.65 | 12.55 | 0.48 | 19.94 | 6.41 |
| 71-2-1c | 78 | 57.9 | 17.7 | 5.31 | 28.61 | 0.73 | 12.6 | 0.47 | 19.78 | 6.39 |
| 71-2-1d | 60 | 59 | 15.8 | 4.51 | 34.24 | 0.68 | 11.64 | 0.18 | 17.82 | 5.54 |
| 71-2-1e | 33 | 59.2 | 14.3 | 4.11 | 47.04 | 0.68 | 8.82 | 0.14 | 13.64 | 4.38 |
| 71-2-1f | 28 | 60.3 | 12.6 | 4.21 | 31.81 | 0.66 | 10.88 | 0.22 | 17.28 | 6.04 |
| 71-2-1g | 23 | 59.7 | 11.5 | 4.57 | | | | | | |
| 71-2-1h | 12 | 58.2 | 9.9 | 2.77 | | | | | | |
| 71-2-1i | 10 | 59.7 | 9 | 3.58 | | | | | | |

Figure 19:
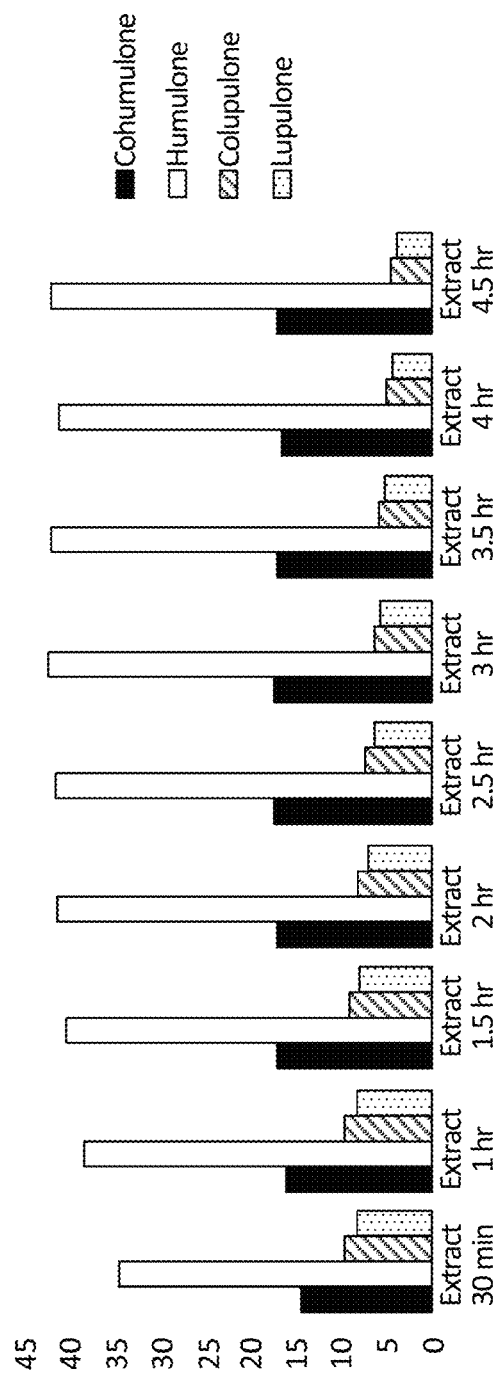
FIG. 19 provides a bar graph of hop acid concentrations of 3700 psi Columbus hop extract samples taken every 30 minutes during extraction as measured by HPLC.

As shown in FIG. 17, each sample of hop extract taken every half hour during extraction time was weighed and analyzed by HPLC and GC for total oils. As shown in FIG. 18, total oil was analyzed by GC to qualify the oils collected at each interval. As shown in FIG. 19, HPLC results of alpha acids (Cohumulone and Humulone) and beta acids (Colupulone and Lupulone) concentrations during each collection time.

Conclusion:

The purpose for this study was to get a better understanding of $CO_2$ Hop Extract using high pressure Supercritical $CO_2$ Extraction and to recognize which hop components are being extracted throughout the process. The results appear to depict how most high alpha acids hop varieties would be extracted, using high pressure of 3700 psi and a temperature of 50° C. The extraction, if conducted again, may be run for a longer period of time to collect the remaining alpha acids from the spent plant material. Analysis of the spent hops showed slightly more than 1% alpha acids left behind. Even though this trial was slightly under extracted, we deduced based on the trend, as seen in Table 3, that there would be moderately high alpha, lower beta, minute quantity of hop oils and possibly a slight increase in H.S.I. results, until no more resin could be extracted.

This extraction trial gave more insight to how quickly hop oils are extracted in the process along with other sought out characteristics of the hop, including not only the bittering contributions of the hop, but components of flavor and aroma.

Example 6

Composite Sampling of Supercritical $CO_2$ Extraction of Columbus at 3700 Psi

Table 12 offers a look at a general trend of alpha, beta, and oil compositions throughout a four (4) hour extraction process. The first two hour split reflects that general point in time at which we see a downward shift in oils extraction and greater upward trend of alpha acid extraction. This point, or shift, in relative amounts of oil extraction versus alpha acid extraction over time may be used to define cut off points for a first fraction and a second fraction. This is a snapshot at 3700 psi, but similar trends have been found at 2200 psi. It is further contemplated that similar trends may be found across our 500-5000 psi range.

TABLE 12

| Sample type | Weight grams | Alpha (HPLC) | Beta (HPLC) | Total Oils |
|---|---|---|---|---|
| Starting $CO_2$ Pellets | X | 15.3 | 4.2 | 2.70 |
| Extract 30 min | 170 | 49.4 | 18.4 | 15.29 |
| Extract 1 hr | 135 | 55.0 | 18.6 | 9.42 |
| Extract 1.5 hr | 78 | 57.9 | 17.7 | 5.31 |
| Extract 2 hr | 60 | 59.0 | 15.8 | 4.51 |
| Extract 2.5 hr | 33 | 59.2 | 14.3 | 4.11 |
| Extract 3 hr | 28 | 60.3 | 12.6 | 4.21 |
| Extract 3.5 hr | 23 | 59.7 | 11.5 | 4.57 |
| Extract 4 hr | 12 | 58.2 | 9.9 | 2.77 |

Figure 20:
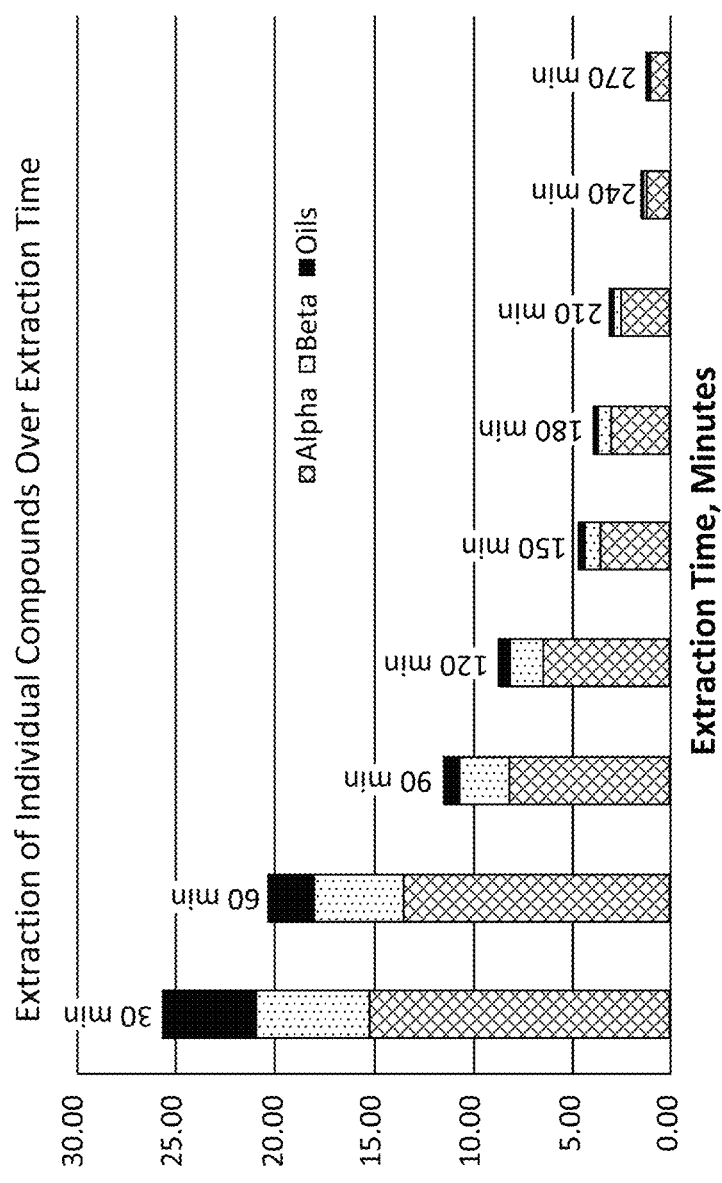

FIG. 20—Composite Sampling of Supercritical $CO_2$ Extraction of Columbus at 3700 psi. Again, this is a reflection of a 3700 psi extraction run using Columbus, however it is believed that this is an appropriate representation of what may be seen across different pressure parameters during the making of enriched oil hop extracts. It appears that uncharacterized material increases throughout the course of the extraction, whereas alpha, beta, oils comprise of a lesser amount of the extract as the length of extract time increases.

Example 7

Aroma Data for Beers Brewed with CITRA Enriched Oil Hop Extract and Pellets

A study was undertaken to compare the aroma impact during brewing of CITRA enriched oil hop extract versus CITRA pellets. Beers were brewed in the John I. Haas Experimental Brewery at the 2.0 hl scale. All of the brews had the same malt bill, utilized $CO_2$ extract at time 0 of wort boil, and had target bitterness of 40 IBU. In order to meet the IBU target for each trial, a number of factors were taken into account. These factors included: point of addition, time in process, and alpha acid utilization.

Two different sets of experiments were run on this base beer. The first utilized either CITRA enriched oil hop extract or CITRA pellet additions to the whirlpool. These products were added 1 minutes after the start of whirlpool with total residence time of 60 minutes. In one experiment, enriched oil hop extract was added at a rate of 0.76 g/l while in the second, 1.42 g/l of pellets were added. Neither of these trials were subjected to dry hopping. The second set of trials involved the same whirlpool addition procedure and amounts outlined above with subsequent dry hopping of the beers during aging. CITRA pellets were used in both experiments for dry hopping at 2.90 g/l for the Enriched oil hop extract beer and 3.87 g/l in the pellet trial. The beers were dry hopped at 16° C. for 4 days.

The finished beers were sent to Oregon State University for laboratory aroma analysis. This was performed on an Agilent Gas Chromatograph equipped with a mass spectrophotometric detector (GCMS). Aroma compounds were captured by exposing a solid phase microextraction (SPME) fiber to the headspace of beer, then desorbing the volatile species from the SPME fiber into the GCMS for analysis. Up to 25 different aroma chemicals can be quantified via this method.

Upon analysis of the beers, it was found that four compounds accounted for the majority of the chemical aroma profile. These were myrcene, linalool, citronellol, and geraniol. The concentrations for these chemicals are listed in Tables 3-4 with corresponding sensory thresholds and descriptors listed in Table 6.

TABLE 13

GCMS ANALYSIS OF AROMA COMPOUNDS IN BEERS WITH HOP PRODUCT ADDITIONS AT WHIRLPOOL WITHOUT PELLET DRY HOPPING.

| | Whirlpool Addition | |
|---|---|---|
| | Enriched oil hop extract GCMS Concentrations ($\mu g/l$) | Pellet GCMS Concentrations ($\mu g/l$) |
| Myrcene | 30.8 | 28.4 |
| Linalool | 734 | 421.5 |
| Citronellol | 192.3 | 65.4 |
| Geraniol | 198.1 | 79.7 |

TABLE 14

GCMS ANALYSIS OF AROMA COMPOUNDS IN BEERS WITH HOP PRODUCT ADDITIONS AT WHIRLPOOL WITH PELLET DRY HOPPING.

| | Whirlpool Addition with Pellet Dry Hopping | |
|---|---|---|
| | Enriched oil hop extract GCMS Concentrations ($\mu g/l$) | Pellet GCMS Concentrations ($\mu g/l$) |
| Myrcene | 306.1 | 304.6 |
| Linalool | 1233.2 | 998.3 |
| Citronellol | 125.7 | 48.9 |
| Geraniol | 329.4 | 257.5 |

TABLE 15

BEER AROMA COMPOUND SENSORY THRESHOLDS AND DESCRIPTORS.

| | Sensory Threshold ($\mu g/l$) | Sensory Descriptors |
|---|---|---|
| Myrcene | 13 | herbaceous, resinous, green, fresh hop, balsamic |
| Linalool | 7 | wood, spicy, lavender, sweet, floral |
| Citronellol | 40 | citrus, floral, rose |
| Geraniol | 184 | floral, rose, waxy, fruit |

While the concentrations of these species is of interest, a measure that is more indicative of sensorial impact is the Odor Activity Value (OAV). (Guth, H. *J. Agric. Food Chem.* 1997, 45, 3027-3032). This was determined by dividing the experimentally determined aroma compound concentration by the corresponding sensory threshold value. For example, dividing the Myrcene enriched oil hop extract GCMS concentration of 30.8 µl/l by the its sensory threshold value of 12 µl/l yields an OAV of 2.4. By convention, OAV's greater than or equal to 1 are considered to be sensorially impactful odorant chemicals. Converting the GCMS concentration data into OAV's yields values listed in Tables 4 and 5.

TABLE 16

OAV'S OF AROMA COMPOUNDS IN BEERS WITH HOP PRODUCT ADDITIONS AT WHIRLPOOL WITHOUT PELLET DRY HOPPING.

| | Whirlpool Addition | |
|---|---|---|
| | Enriched oil hop extract Odor Activity Value (IOAV) | Pellet Odor Activity Value (POAV) |
| Myrcene | 2.4 | 2.2 |
| Linalool | 104.9 | 60.2 |
| Citronellol | 4.8 | 1.6 |
| Geraniol | 1.1 | 0.4 |

TABLE 17

OAV'S OF AROMA COMPOUNDS IN BEERS WITH HOP PRODUCT ADDITIONS AT WHIRLPOOL WITH PELLET DRY HOPPING.

| | Whirlpool Addition with Pellet Dry Hopping | |
|---|---|---|
| | Enriched oil hop extract Odor Activity Value (IOAV) | Pellet Odor Activity Value (POAV) |
| Myrcene | 23.5 | 23.4 |
| Linalool | 176.2 | 142.6 |
| Citronellol | 3.1 | 1.2 |
| Geraniol | 1.8 | 1.4 |

As can be seen from the OAV data, Myrcene, Linalool, and Citronellol were shown to be sensorially impactful in all of the brewing trials (Tables 16 and 17). Geraniol can also be considered impactful in all trials with the exception of the pellet whirlpool addition without dry hopping beer (Table 7). It should be noted that all other aroma compounds detected in these beers had OAV's significantly less than 1 (data not listed).

These results strongly indicated that enriched oil hop extract has a more favorable aroma impact relative to pellets in dry hopped and non-dry hopped beers. Brewers consider high Myrcene levels in beer to be undesirable. Myrcene OAV's were effectively the same in both sets of brewing trials. From these results, it can be concluded that relative to pellets, enriched oil hop extract did not enhance any negative aroma effects due to Myrcene. The OAV data for Linalool, Citronellol, and Geraniol also demonstrated the benefit of using enriched oil hop extract instead of pellets during brewing. For all three of these compounds OAV's were significantly higher for beers brewed with enriched oil hop extract relative to pellets. This suggests that when compared to pellet hopped beer, enriched oil hop extract-brewed beer will have higher levels of desired aroma characteristics such as citrus, floral, and fruit. Sensory data established within the patent application therein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of making a pourable extract comprising: passing $CO_2$ through hop materials; producing a first extracted fraction and a second extracted fraction; and collecting the first extracted fraction during a first time period and the second extracted fraction during a second time period; wherein the first extracted fraction is extracted at a pressure of 2200 psi and the second extracted fraction is extracted at a pressure of 3700 psi, wherein the first time period is between about 20 minutes to about 2 hours and the second time period is between about 2 hours to about 5 hours, and wherein the first extracted fraction is pourable and has a viscosity of from about 1 to 3 Pas at 30° C. to 40° C.

2. The method of claim 1, wherein the first time period is about two hours.

3. The method of claim 1, wherein the first fraction comprises hop oils in an amount between about 6 mL/100 g to about 40 mL/100 g.

4. The method of claim 1, wherein the second fraction comprises about 50% to about 70% (w/w) alpha acids.

5. A method of producing aroma and flavor enhanced beer comprising:
making a pourable extract comprising the steps of:
passing $CO_2$ through hop materials; producing a first extracted fraction and a second extracted fraction; collecting the first extracted fraction during a first time period and the second extracted fraction during a second time period; wherein the first extracted fraction is extracted at a pressure of 2200 psi and the second extracted fraction is extracted at a pressure of 3700 psi, wherein the first time period is between about 20 minutes to about 2 hours and the second time period is between about 2 hours to 5 hours, wherein the first extracted fraction comprises hop oils in an amount between about 6 mL/100 g to about 40 mL/100 g; wherein the first extracted fraction is pourable, and wherein the second fraction comprises about 50% to about 70% (w/w) alpha acids;
introducing the pourable extract into wort during a whirlpool step;
wherein the amount of pourable extract introduced is 0.42-1 gram per liter of wort, and wherein the pourable extract has a viscosity of from about 1 to 3 Pas at 30° C. to 40° C.

6. The method of claim 5, further comprising reducing an amount of alpha acids introduced into the liquid to avoid over-bittering the beer.

7. The method of claim 5, further comprising using the pourable extract to deliver a dry hopped flavor profile to a beer.

8. The method of claim 5, further comprising introducing uncharacterized materials in an amount of about 0% (w/w) to about 3% (w/w) and adding the pourable extract for a concentration of about 50 to about 120 g/bbl.

9. The method of claim 5, further comprising introducing the second extracted fraction comprising about 50% to about 70% (w/w) alpha acids for more efficient bittering of the beer.

10. The method of claim 5, wherein the aroma and flavor enhanced beer has greater overall hop aroma intensity.

11. The method of claim 5, wherein the aroma and flavor enhanced beer has greater citrus flavor, greater fruity flavor, or both.

12. The method of claim 5, further comprising molecular distillation of the second extracted fraction to extract hop oils, wherein the hop oils are added to the first extracted fraction.

* * * * *